(12) United States Patent
Ohishi et al.

(10) Patent No.: US 7,944,618 B2
(45) Date of Patent: May 17, 2011

(54) OPTICAL ELEMENT AND IMAGING APPARATUS

(75) Inventors: Tadahiro Ohishi, Gifu (JP); Keita Tanaka, Aichi (JP); Masaki Ando, Tokyo (JP); Kazuhiro Tanaka, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/692,985

(22) Filed: Jan. 25, 2010

(65) Prior Publication Data
US 2010/0134861 A1 Jun. 3, 2010

Related U.S. Application Data

(63) Continuation of application No. 11/726,360, filed on Mar. 21, 2007, now Pat. No. 7,697,213.

(30) Foreign Application Priority Data

Mar. 28, 2006 (JP) ................ P2006-088810

(51) Int. Cl.
G02B 1/06 (2006.01)
(52) U.S. Cl. ........................................ 359/665
(58) Field of Classification Search .................. 359/665, 359/254; 250/229
See application file for complete search history.

(56) References Cited

U.S. PATENT DOCUMENTS

| 3,990,783 | A | 11/1976 | Kohashi et al. |
|---|---|---|---|
| 4,636,785 | A | 1/1987 | Le Pesant et al. |
| 4,701,021 | A | * | 10/1987 | Le Pesant et al. ............. 359/228 |
| 5,181,016 | A | 1/1993 | Lee |
| 6,565,727 | B1 | 5/2003 | Shenderov |
| 6,778,328 | B1 | 8/2004 | Aizenberg et al. |
| 7,427,745 | B2 | 9/2008 | Linke et al. |
| 2006/0044448 | A1 | 3/2006 | Kato et al. |

FOREIGN PATENT DOCUMENTS

| EP | 1 400 834 | 3/2004 |
|---|---|---|
| JP | 59-206868 A | 11/1984 |
| JP | 60-037589 A | 2/1985 |
| JP | 2001-228307 A | 8/2001 |
| JP | 2004-110041 A | 4/2004 |
| JP | 2004-336898 A | 11/2004 |
| WO | 2004-030820 A2 | 4/2004 |
| WO | 2005/088610 A3 | 9/2005 |

* cited by examiner

*Primary Examiner* — Joseph Martinez
(74) *Attorney, Agent, or Firm* — Lerner, David, Littenberg, Krumholz & Mentlik, LLP

(57) ABSTRACT

An optical element is disclosed. The optical element may include a container having a holding chamber, a polar or conductive first liquid filled in the holding chamber, a second liquid filled in the holding chamber and not mixing with the first liquid, first and second electrodes for applying an electric field to the first liquid, and voltage application means for applying voltage between the first electrode and the second electrode.

14 Claims, 21 Drawing Sheets

BEFORE LIGHT IS INTERRUPTED

WHEN LIGHT IS INTERRUPTED

BEFORE LIGHT IS INTERRUPTED

WHEN LIGHT IS INTERRUPTED

OPTICAL ELEMENT AND IMAGING APPARATUS

CROSS-REFERENCE TO RELATED APPLICATIONS

This application is a continuation of U.S. application Ser. No. 11/726,360 filed on Mar. 21, 2007, which claims priority for Japanese Application No. JP 2006-088810 filed on Mar. 28, 2006, the disclosure of which is incorporated herein by reference.

BACKGROUND OF THE INVENTION

1. Field of the Invention

The present invention relates to an optical element and an imaging apparatus.

2. Description of the Related Art

An optical element has been proposed which changes the optical characteristic of a polar or conductive liquid by changing the conductivity or the form of the liquid based on an electric capillary phenomenon (electrowetting phenomenon) through the application of an electric field to the liquid.

Liquid moving means has been proposed which moves a polar or conductive liquid itself in a desired direction by applying an electric field to the liquid (refer to JP-A-2004-336898 (Patent Document 1)).

The liquid moving means includes a first electrode in contact with a liquid (or liquid drop), multiple second electrodes provided to a liquid through an insulating layer and aligned in a predetermined direction and control means for controlling each voltage to be applied between the first electrode and each of the second electrodes. In this case, the liquid on the insulating layer is moved in the predetermined direction by changing the position subject to the application of voltage in the second electrodes by the control means.

BRIEF SUMMARY OF THE INVENTION

An increase in speed of the movement of a liquid is demanded in order to improve the response property of a shutter including the liquid moving means on the optical axis of a shooting optical system of an imaging apparatus, in which the liquid is moved in the direction orthogonal to the optical axis.

However, the technology in the past has a limited increase in strength of the electric field to be applied to a liquid, which also limits the increase in speed of the movement of the liquid.

Accordingly, it is desirable to propose an optical element, which is advantageous for improving the response property, and an imaging apparatus including the optical element.

According to an embodiment of the present invention, there is provided an optical element which may include a container having a holding chamber, a polar or conductive first liquid filled in the holding chamber, a second liquid filled in the holding chamber and not mixing with the first liquid, first and second electrodes for applying an electric field to the first liquid, and voltage application means for applying voltage between the first electrode and the second electrode, wherein the change of the position subject to the voltage application by the voltage application means to the first and second electrodes may move the first liquid in the second liquid within the holding chamber, the holding chamber may have an adjustment chamber adjusting the amount of transmitted light based on the presence of the first liquid and multiple lay-by chambers connecting to the adjustment chamber and allowing the accommodation of the first liquid laid by from the adjustment chamber, the adjustment chamber and the multiple lay-by chambers may have first and second end walls facing against each other in the direction that the light passes through, the first electrode may be provided on one end wall of the first and second end walls of the adjustment chamber and multiple lay-by chambers, and the second electrode may be provided on the other end wall of the first and second end walls.

According to another embodiment of the invention, there is provided an optical element which may include a container having a holding chamber, a polar or conductive first liquid filled in the holding chamber, a second liquid filled in the holding chamber and not mixing with the first liquid, first and second electrodes for applying an electric field to the first liquid, and voltage application means for applying voltage between the first electrode and the second electrode, wherein the change of the position subject to the voltage application by the voltage application means to the first and second electrodes may move the first liquid in the second liquid within the holding chamber, the holding chamber includes first and second end walls facing against each other in the direction that light passes through, the first electrode may be provided on one end wall of the first and second end walls, and the second electrode may be provided on the other end wall of the first and second end walls, the second electrode may include a central electrode member and multiple surrounding electrode members around the central electrode member, and the first electrode may include a single electrode member facing against the central electrode member and the multiple surrounding electrode members.

According to another embodiment of the invention, there is provided an imaging apparatus which may include a shooting optical system conducting a subject image, an imaging element on the optical axis of the shooting optical system, and an optical element before the imaging element on the optical axis, wherein the optical element has a container having a holding chamber, a polar or conductive first liquid filled in the holding chamber, a second liquid filled in the holding chamber and not mixing with the first liquid, first and second electrodes for applying an electric field to the first liquid, and voltage application means for applying voltage between the first electrode and the second electrode, the change of the position subject to the voltage application by the voltage application means to the first and second electrodes may move the first liquid in the second liquid within the holding chamber, the holding chamber may have an adjustment chamber for adjusting the amount of transmitted light based on the presence of the first liquid and multiple lay-by chambers connecting to the adjustment chamber and allowing the accommodation of the first liquid laid by from the adjustment chamber, the adjustment chamber and the multiple lay-by chambers may have first and second end walls facing against each other in the direction that the light passes through, and the first electrode may be provided on one end wall of the first and second end walls of the adjustment chamber and multiple lay-by chambers, and the second electrode may be provided on the other end wall of the first and second end walls.

According to another embodiment of the invention, there is provided an imaging apparatus which may include a shooting optical system conducting a subject image, an imaging element on the optical axis of the shooting optical system, and an optical element before the imaging element on the optical axis, wherein the optical element has a container having a holding chamber, a polar or conductive first liquid filled in the holding chamber, a second liquid filled in the holding chamber and not mixing with the first liquid, first and second electrodes for applying an electric field to the first liquid, and voltage application means for applying voltage between the first electrode and the second electrode, the change of the position subject to the voltage application by the voltage application means to the first and second electrodes may move the first liquid in the second liquid within the holding chamber, the holding chamber may have first and second end walls facing against each other in the direction that light passes through, the first electrode may be provided on one end wall of the first and second end walls, and the second electrode may be provided on the other end wall of the first and second end walls, the second electrode may include a central electrode member and multiple surrounding electrode members around the central electrode member, and the first electrode may include a single electrode member facing against the central electrode member and the multiple surrounding electrode members.

According to the embodiments of the invention, the application of voltage to the first liquid by the multiple electrode members in the holding chamber may divide and move the first liquid. Thus, the mass and travel of the first liquid can be reduced in comparison with the case that the first liquid is entirely moved. Therefore, the speed of movement of the first liquid can be increased, which is advantageous for improvement of the response property of an optical element.

DETAILED DESCRIPTION

First Embodiment

The operational principle of liquid movement by an electric field will be first described.

Figure 1A:
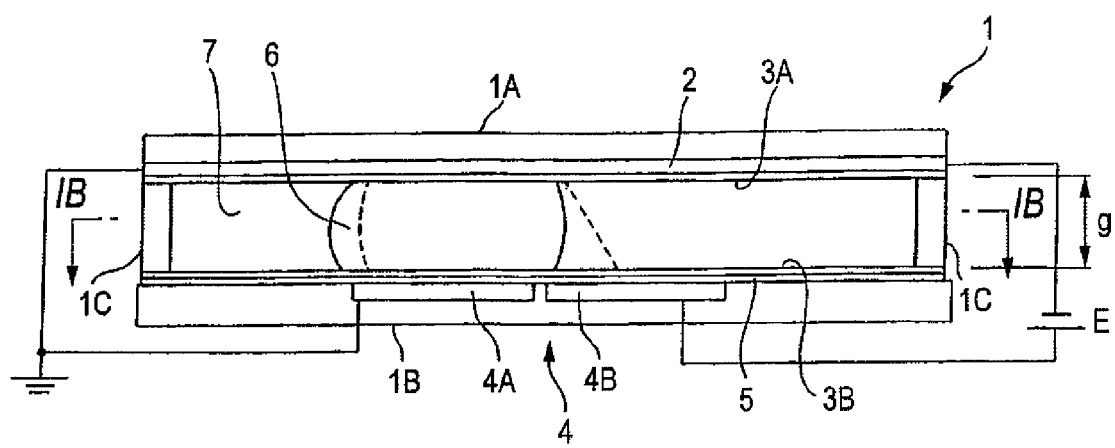
FIG. 1A is a section diagram describing the principle of movement of a liquid.
Figure 1B:
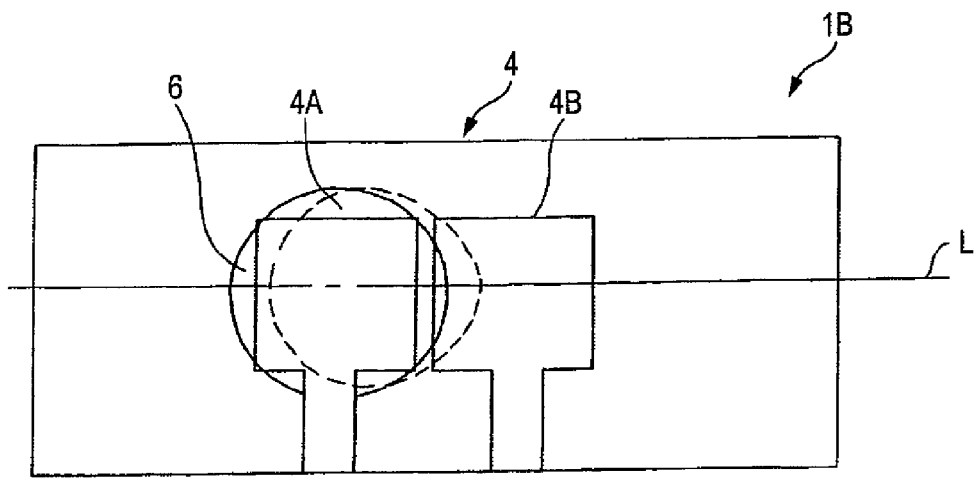
FIG. 1B is a view on the arrows A in FIG. 1A.

FIG. 1A is a section diagram describing the principle of liquid movement, and FIG. 1B is a view on the arrows A in FIG. 1A.

As shown in FIGS. 1A and 1B, a holding chamber 1 is tightly enclosed by first and second end walls 1A and 1B facing against each other and having a space g therebetween in the direction that light passes through and side walls 1C connecting the first and second end walls 1A and 1B.

A first electrode 2 is provided on the entire inner surface of the first end wall 1A, and the surface where the first electrode 2 faces the holding chamber 1 is covered by a water-repellent film 3A.

A second electrode 4 is provided on the inner surface of the second end wall 1B, and the second electrode 4 includes two electrode bodies 4A and 4B aligned along a virtual axis L extending in the direction orthogonal to the direction in which the first and second end walls 1A and 1B face against each other.

The entire areas of the surfaces of the two electrode bodies 4A and 4B and the inner surface of the second end wall 1B are covered by an insulating film 5, and the entire area of the surface of the insulating film 5 facing the holding chamber 1 is covered by a water-repellent film 3B.

A first liquid 6 and a second liquid 7 are filled in the holding chamber 1. The first liquid 6 is polar or conductive, and the second liquid 7 is filled around the first liquid 6 and does not mutually mix with the first liquid 6.

The first electrode 2 faces the first liquid 6 through the water-repellent film 3A, and the second electrode 4 faces the first liquid 6 through the insulating film 5 and the water-repellent film 3B.

The first electrode 2 and the two electrode bodies 4A and 4B of the second electrode 4 are initially both grounded, and the first liquid 6 at that state is positioned across the entire area of the one electrode body 4A and the part of the other electrode body 4B which is closer to the electrode body 4A.

At this state, the first liquid 6 has a round form at the plane vision as indicated by the solid line in the FIGS. 1A and 1B due to the surface tension.

When a voltage E is applied to the other electrode body 4B here, the part where the insulating film 5 faces the first liquid 6 is positively charged. Thus, an electric field (electrostatic force) is applied to the part where the first liquid 6 faces the insulating film 5, and negative charges, that is, the molecules of the first liquid 6 are pulled to the position where the first liquid 6 faces the insulating film 5.

Then, the first liquid 6 changes the form as being pulled toward the electrode body 4B as indicated by the broken lines in FIGS. 1A and 1B. In the end, all of the first liquid 6 surrounded by the second liquid 7 moves from the above of the one electrode body 4A to the above of the other electrode body 4B in the direction of the extension of the virtual axis L.

The water-repellent films 3A and 3B act for reducing the resistance of the first liquid 6, which is caused between the liquid 6 and the first and second end walls 1A and 1B when the first liquid 6 moves above the first and second electrodes 2 and 4, such that the first liquid 6 can move thereabove easily.

In this way, the polar or conductive first liquid 6 is moved by applying an electric field to the first liquid 6 by the first and second electrodes 2 and 4.

Next, an optical element 10 of this embodiment will be described.

According to this embodiment, the optical element 10 functions as a shutter.

Figure 2A:
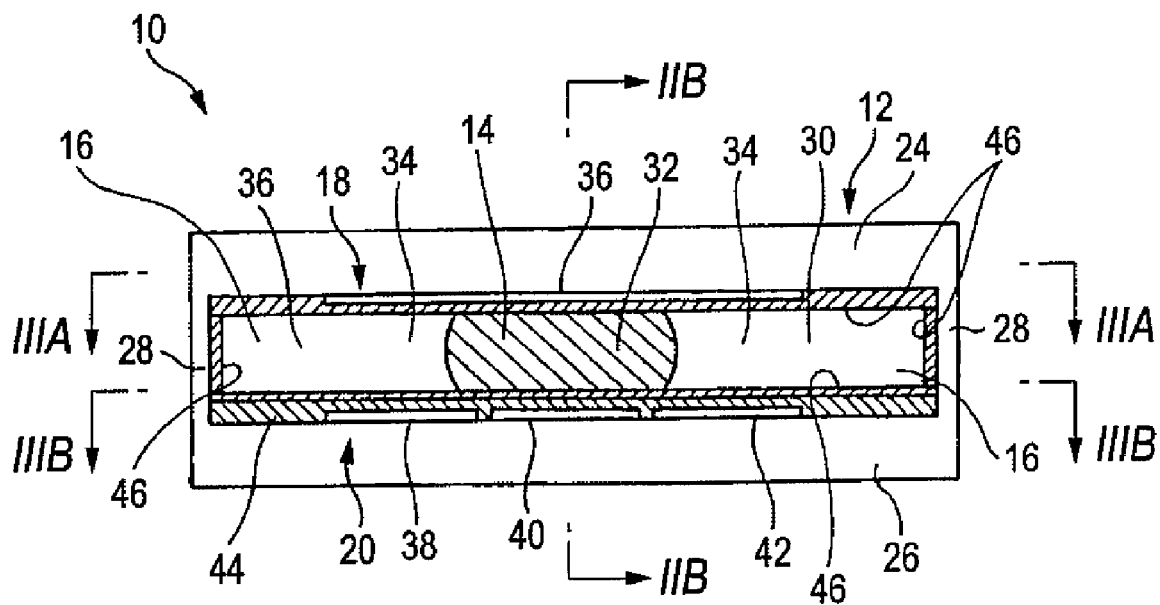
FIG. 2A is a longitudinal section diagram showing a construction of an optical element 10.
Figure 2B:
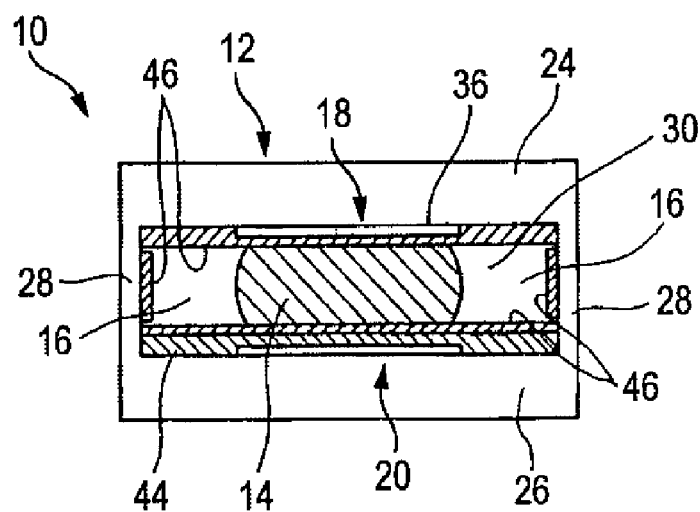
FIG. 2B is a view on the arrows A in FIG. 2A.

FIG. 2A is a longitudinal section diagram showing a construction of the optical element 10, and FIG. 2B is a view on the arrows A in FIG. 2A.

Figure 3A:
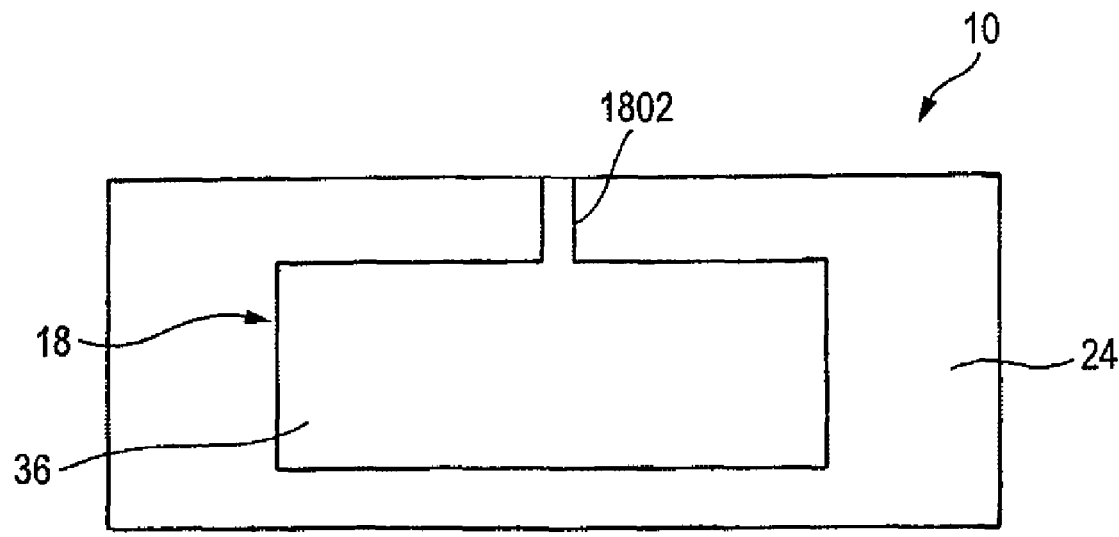
FIG. 3A is a section diagram taken by the line B-B in FIG. 2A.
Figure 3B:
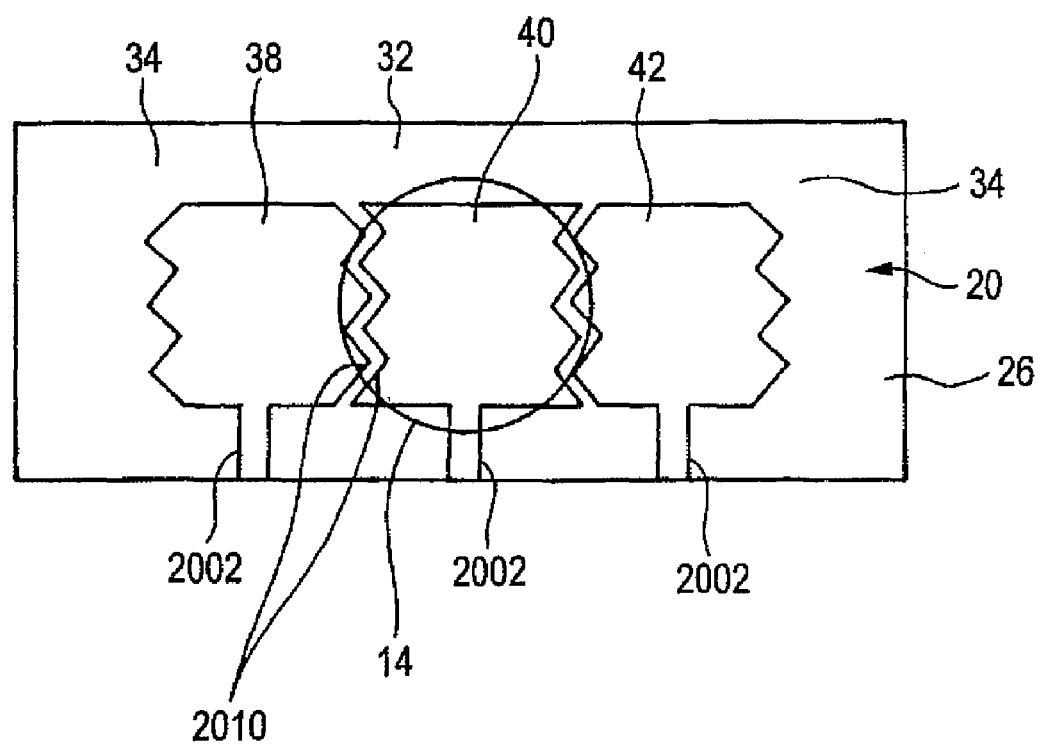
FIG. 3B is a view on the arrows C in FIG. 2A.

FIG. 3A is a section diagram taken by the line B-B in FIG. 2A, and FIG. 3B is a view on the arrows C in FIG. 2A.

Figure 4:
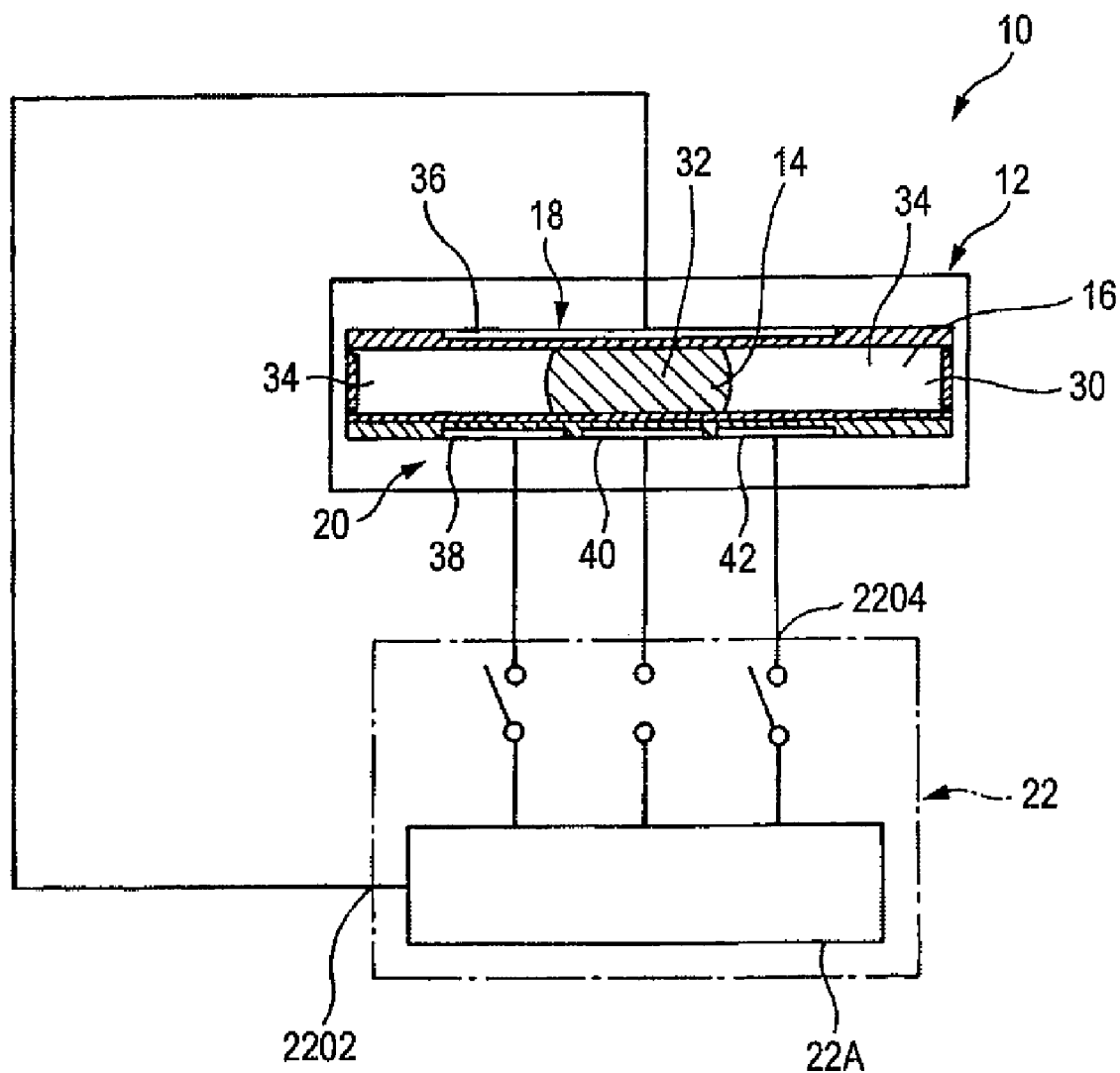
FIG. 4 is an explanatory diagram describing an operation of the optical element 10.
Figure 5:
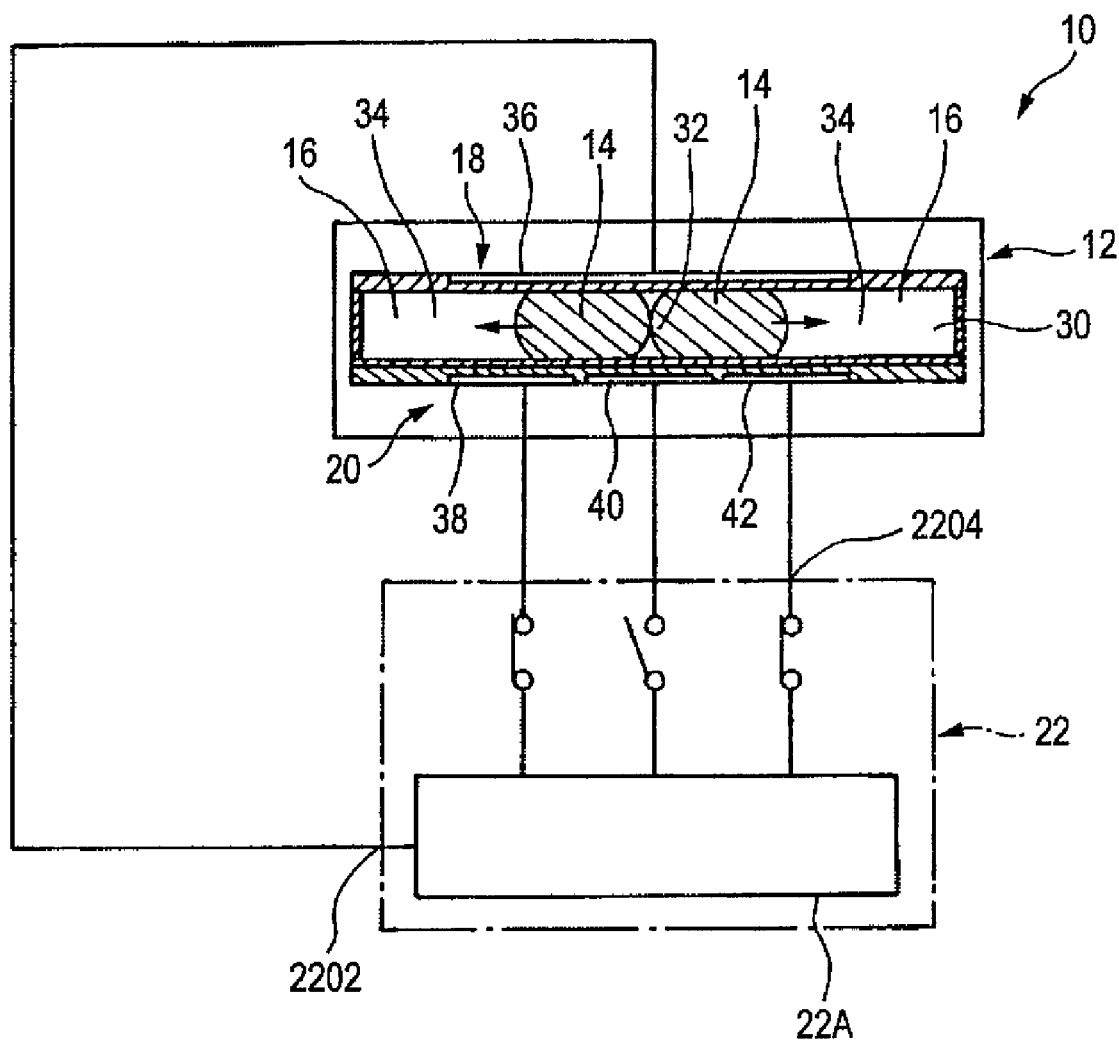
FIG. 5 is an explanatory diagram describing an operation of the optical element 10.
Figure 6:
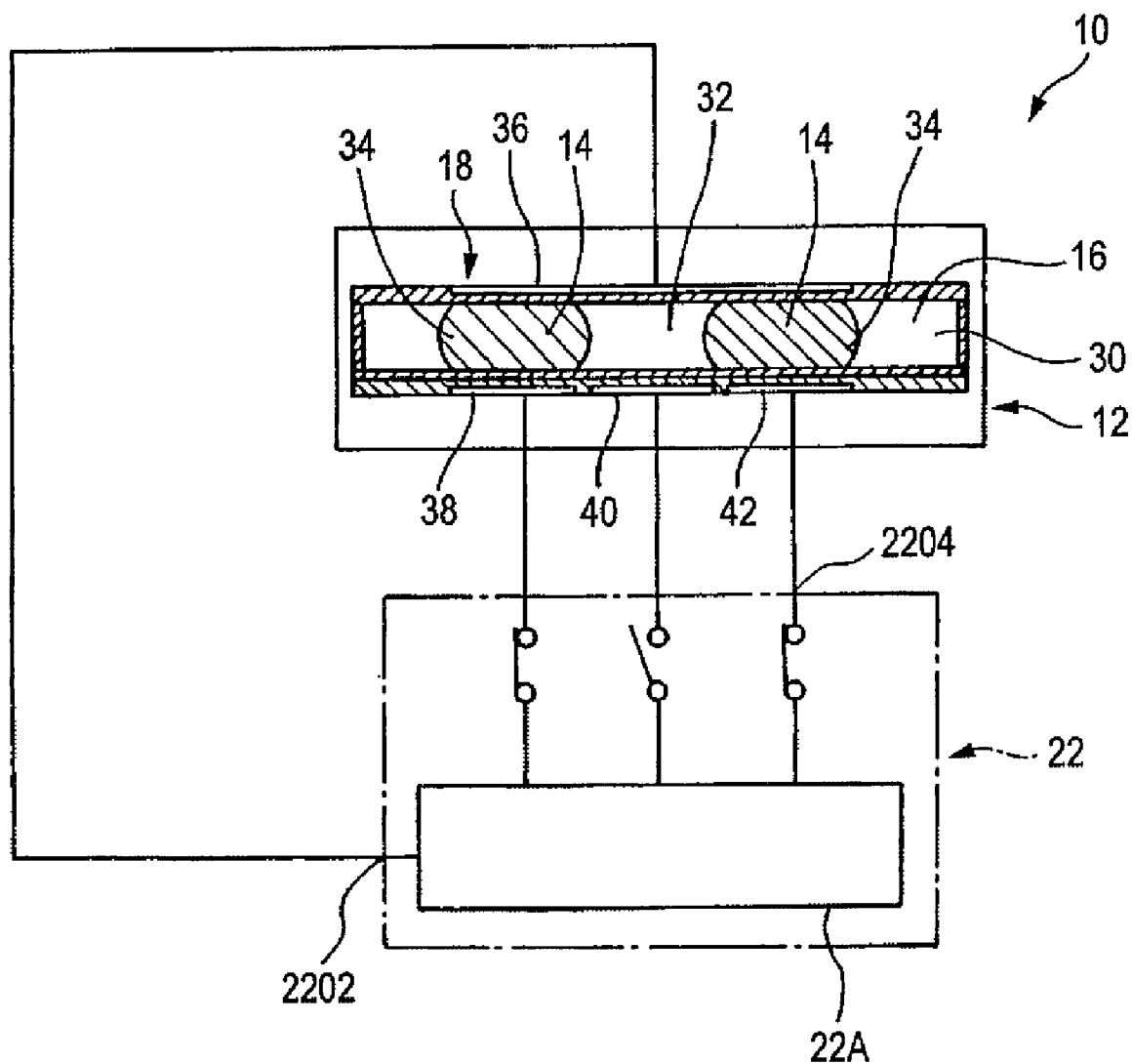
FIG. 6 is an explanatory diagram describing an operation of the optical element 10.

FIGS. 4, 5 and 6 are explanatory diagrams describing operations of the optical element 10.

As shown in FIGS. 2A and 2B, the optical element 10 includes a container 12, a first liquid 14, a second liquid 16, a first electrode 18 and a second electrode 20, and a voltage application section 22 (see FIG. 4).

The container 12 has first and second end walls 24 and 26 facing and extending against each other in parallel, side walls 28 connecting the first and second end walls 24 and 26 and a holding chamber 30 tightly enclosed by the first and second end walls 24 and 26 and the side walls 28.

The first and second end walls 24 and 26 contain an insulating material, and the first and second end walls 24 and 26 contain a clear material that allows light to pass through.

The first and second end walls 24 and 26 may contain a clear and insulating synthetic resin material or a clear glass material, for example.

The expression, "the direction of thickness of the container 12", refers to the direction in which the first end wall 24 and the second end wall 26 face against each other and which is the direction that light passes through the optical element 10.

According to this embodiment, the first and second end walls 24 and 26 have a same rectangular plate form in a same size. The side walls 28 have a rectangular frame form along the contours of the first and second end walls 24 and 26. The holding chamber 30 has a flat column form, and the holding chamber 30 has a uniform rectangular section extending in the direction orthogonal to the direction that light passes through.

The holding chamber 30 includes an adjustment chamber and multiple lay-by chambers 34. In other words, the adjustment chamber 32 and the multiple lay-by chambers 34 have the first and second end walls 24 and 26 facing against each other in the direction that light passes through.

The adjustment chamber 32 is used for adjusting the amount of transmitted light based on the presence of the first liquid 14. The lay-by chambers 34 connect to the adjustment chamber 32 and can hold the first liquid 14 laid by from the adjustment chamber 32.

According to this embodiment, the adjustment chamber positions at the center of the holding chamber 30 in the direction of the extension. The lay-by chambers 34 are provided on both sides of the holding chamber 30 in the direction of the extension. According to this embodiment, the direction of the extension of the holding chamber 30 is parallel to the direction of the long side of the container 12.

In other words, the two lay-by chambers 34 connect to the adjustment chamber 32 from the direction orthogonal to the direction that light passes through and are provided on both sides of the adjustment chamber 32 and on the straight line extending in the direction orthogonal to the direction that light passes through.

The first liquid 14 is polar or conductive and is filled in the holding chamber 30.

The second liquid 16 does not mutually mix with the first liquid 14 and is filled around the first liquid 14 in the holding chamber 30.

The first liquid 14 and the second liquid 16 substantially have an equal specific gravity, and the transmittance of the first liquid 14 is lower than the transmittance of the second liquid 16.

According to this embodiment, the first liquid 14 is formed by mixing fine particles containing a material that does not allow light to pass through into a liquid containing a mix of pure water, ethanol and ethylene glycol, for example.

The fine particles may include carbon black. If carbon black is used therefor, hydrophilic coating processing is preferably performed on the surface of the carbon black such that the carbon black can be uniformly mixed into the first liquid 14. The hydrophilic coating processing may be performed by forming a hydrophilic group on the surface of the carbon black, for example.

According to this embodiment, the second liquid 16 contains a clear silicon oil.

The use of one with a low viscosity as the silicon oil contained in the second liquid 16 can reduce the viscous drag between the first and second liquids 14 and 16 and alleviate the friction between the first liquid 14 and the first and second end walls 24 and 26, which is advantageous for the improvement in the response property by an increase in speed of movement of the first liquid 14.

The liquid which can be used as the first liquid 14 is not limited to the one in this embodiment but may be nitromethane, acetic anhydride, methyl acetate, ethyl acetate, methanol, acetonitrile, acetone, ethanol, propionitrile, tetrohydrofuran, n-hexane, 2-propanol, 2-butanone, n-butyronitrile, 1-propanol, 1-butanol, dimethyl sulfoxide, chlorobenzene, ethylene glycole, formamide, nitrobenzene, propylene carbonate, 1,2-dichloroethane, carbonate disulfide, chloroform, bromobenzene, carbon tetrachloride, trichloroacetic acid anhydride, toluene, benzene, ethylenediamine, N,N-dimethylacetamide, N,N-dimethylformamide, tributyl phosphate, pyridine, benzonitrile, aniline, 1,4-dioxane or hexamethylphosphoramide, for example.

The liquid applicable as the second liquid 16 may be silicon, decane base, octane base, nonane or heptane, for example.

Each of the first liquid 14 and the second liquid 16 may be a single liquid or a mix of multiple liquids. In other words, the first liquid 14 and the second liquid 16 may be only required to have a substantially equal specific gravity.

The first and second electrodes 18 and 20 are used for applying an electric field to the first liquid 14.

As shown in FIGS. 2A and 3A, the first electrode 18 is provided on the first end wall 24 of the adjustment chamber and two lay-by chambers 34. According to this embodiment, the first electrode 18 includes a single electrode member 36 extending across the first end wall 24 of the adjustment chamber 32 and two lay-by chambers 34. According to this embodiment, as shown in FIG. 3A, the electrode member 36 has rectangular contours, which is one-size-smaller than the contours of the first end wall 24.

As shown in FIGS. 2A and 3B, the second electrode 20 is provided on the second end wall 26 of the adjustment chamber and two lay-by chambers 34. According to this embodiment, the second electrode 20 includes three separate electrode members 38, 40 and 42. One electrode member 40 of the three electrode members 38, 40 and 42 is provided to the second end wall 26 of the adjustment chamber 32, and the remaining two electrode members 38 and 42 are provided to the two lay-by chambers 34.

These three electrode members 38, 40 and 42 are placed along a straight line extending in the direction orthogonal to the direction that light passes through. According to this embodiment, the straight line is parallel to the direction of the long side of the container 12.

According to this embodiment, as shown in FIG. 3B, the three electrode members 38, 40 and 42 have a same form in a same size and are equally spaced apart from each other.

The mutually adjacent edges of the electrode members 38, 40 and 42 have pits and projections 2010 extending in the direction orthogonal to the direction of the extension of the straight line. The adjacent electrode members are placed where the pits and projections 2010 are parallel to, are spaced apart from and face against each other. According to this embodiment, the pits and projections 2010 have a triangular waveform with a uniform amplitude.

The first and second electrodes 18 and 20, that is, the electrode members 36, 38, 40 and 42 may contain a conductive material such as an ITO film (Indium Tin Oxide film) that allows light to pass through, for example.

In FIGS. 3A and 3B, a wiring section 1802 extends from the electrode 36, and a wiring section 2002 extends from the electrode members 38, 40 and 42.

As shown in FIG. 4, the voltage application section 22 is provided outside of the container 12 and includes a ground terminal 2202 electrically connecting to the first electrode 18 through the wiring section 1802 (see FIG. 3A) and multiple voltage output terminals 2204 electrically connecting to the electrode members 38, 40 and 42 of the second electrode 20 through the wiring section 2002 (see FIG. 3B).

The voltage application section 22 has a power supply 22A that outputs a voltage E and is configured to be capable of applying the voltage E selectively to each of the electrode members 38, 40 and 42 of the second electrode 20 through the voltage output terminals 2204.

As shown in FIGS. 2A and 2B, an insulating film 44 is provided on the internal surface of the second end wall 26 facing the holding chamber 30 and the second electrode 20 on the internal surface.

Thus, voltage is applied between the first electrode and the second electrode 20, whereby the surface of the insulating film 44 may be positively charged, for example. Hence, an electric field is applied to the first liquid 14, and the electric field (electrostatic force) acts on the molecules of the first liquid 14. As a result, the first liquid 14 moves.

A clear water-repellent film 46 that allows light to pass through covers the internal surface of the second end wall 26 and the entire area of the first electrode 18.

The water-repellent film 46 covers the internal surfaces of the side walls 28.

The water-repellent film 46 is configured such that the wettability against the second liquid 16 can be higher than the wettability against the first liquid 14. In other words, the angle of contact of the second liquid 16 against the water-repellent film 46 is configured so as to be smaller than the angle of contact of the first liquid 14 against the water-repellent film 46.

The water-repellent film 46 reduces the resistance caused between the first liquid 14 and the first and second end walls 24 and 26 when the first liquid 14 moves on the first and second electrodes 18 and 20 such that the first liquid 14 can move easily.

The water-repellent film 46 is a lipophilic film and may be formed by burning a material mainly containing silicon thereto or by forming a film of a material containing amorphous fluoroplastics thereon, for example. Various publicly known materials in the past may be adopted as the water-repellent film 46.

Next, an operation of the optical element 10 will be described.

Figure 7A:
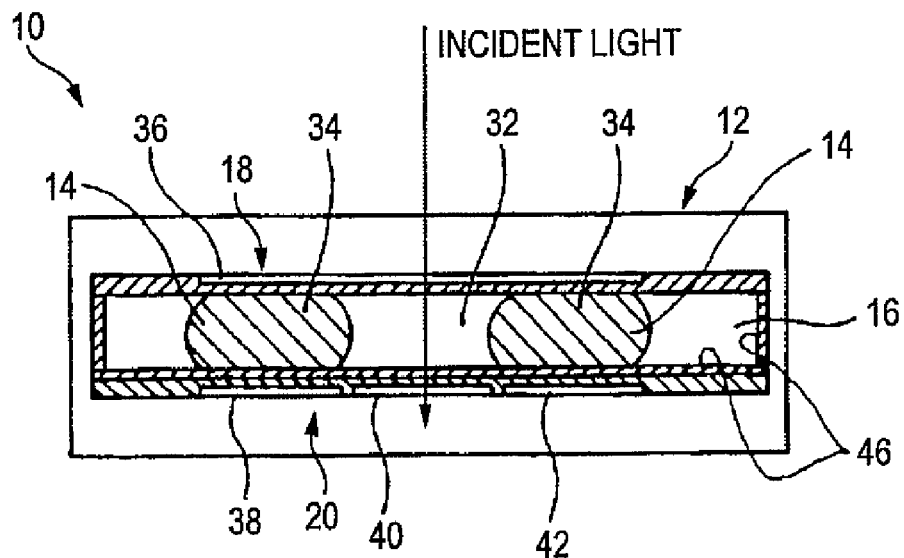
FIGS. 7A and 7B are explanatory diagrams describing an operation of the optical element 10.
Figure 7B:
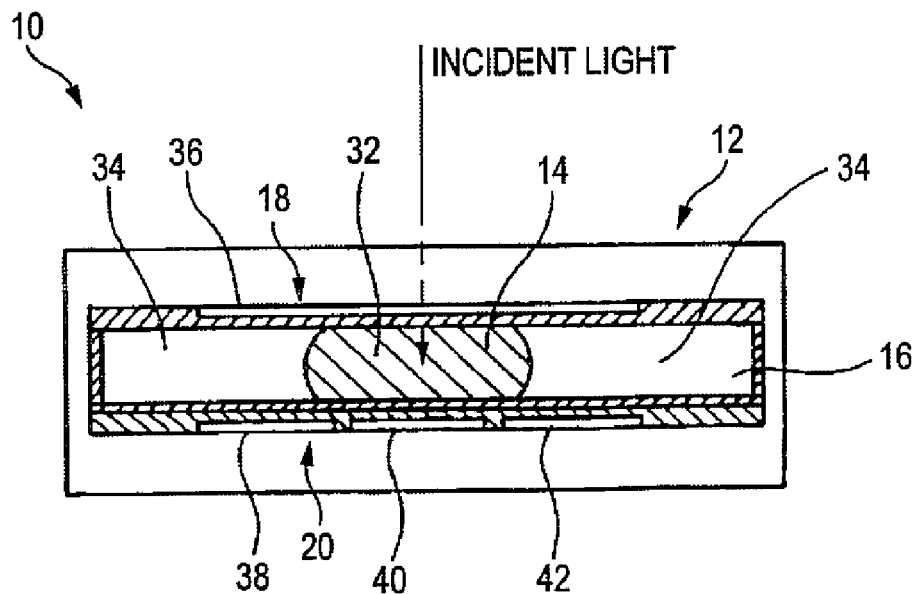

FIGS. 7A and 7B are explanatory diagrams describing an operation of the optical element 10.

First of all, an operation will be described in a case that the adjustment chamber 32 of the optical element 10 changes from the state that interrupts light to the state that allows light to pass through.

As shown in FIG. 4, the first liquid 14 is initially positioned between the electrode member 36 of the first electrode 18 and the central electrode member 40 of the second electrode 20 in the adjustment chamber 32.

Under this state, the voltage application section 22 applies the voltage E to the central electrode member 40 and opens (or applies the ground potential to) the remaining two electrode members 38 and 42.

Thus, the electric field by the voltage E applied to the first electrode 18 and central electrode member 40 acts on the first liquid 14 facing the central electrode member 40, whereby the first liquid 14 does not move and can be held at the position. As a result, a most part of the first liquid 14 faces the central electrode member 40, and parts of the first liquid 14 face the adjacent two electrode members 38 and 42.

Under this condition, as shown in FIG. 7B, the incident light traveling toward the adjustment chamber 32 is interrupted by the first liquid 14 positioned in the adjustment chamber 32 and having a low transmittance.

Next, as shown in FIG. 5, the voltage application section 22 opens (or applies the ground potential to) the central electrode member 40 and applies the voltage E to the remaining two electrode members 38 and 42. In other words, the position subject to the voltage application to the second electrode 20 is changed to the remaining two electrode members 38 and 42.

Then, as shown in FIG. 5, the electric field by the voltage E applied to the first electrode 18 and two electrode members 38 and 42 acts on the first liquid 14 facing the central electrode member 40, whereby the half of the first liquid 14 surrounded by the second liquid 16 moves toward one of the lay-by chambers 34, and, at the same time, the other half of the first liquid 14 moves toward the other lay-by chamber 34.

Thus, as shown in FIG. 6, the first liquid 14 is divided into two, which are then held by the two lay-by chambers 34. Therefore, the half of the first liquid 14 is held in one of the lay-by chambers 34, and the remaining half of the first liquid 14 is held in the other lay-by chamber 34.

In this case, a most part of the one divided first liquid 14 faces the electrode member 38 on one side, and a part of the divided first liquid 14 faces the adjacent central electrode member 40. A most part of the other divided first liquid 14 faces the electrode member 42 on the other side, and a part of the other divided first liquid 14 faces the adjacent central electrode member 40.

Under this condition, as shown in FIG. 7A, the incident light traveling toward the adjustment chamber 32 passes through the second liquid 16 positioned in the adjustment chamber 32 and having a high transmittance.

Next, an operation will be described in a case that the adjustment chamber 32 of the optical element 10 changes from the state that allows light to pass through to the state that interrupts light, conversely to the above.

As shown in FIG. 6, the divided first liquids 14 are held in the two lay-by chambers 34. Under this state, the voltage application section 22 applies the voltage E to the central electrode member 40 and opens (or applies the ground potential to) the remaining two electrode members 38 and 42.

Thus, as shown in FIG. 5, the electric field by the voltage E applied to the first electrode 18 and central electrode member 40 acts on the divided first liquids 14 facing the two electrode members 38 and 42, whereby the divided first liquids 14 surrounded by the second liquid 16 move from the lay-by chambers 34 to the adjustment chamber 32.

Hence, as shown in FIG. 4, the two divided first liquids 14 are held by and combined in the adjustment chamber 32.

Therefore, the electric field by the voltage E applied to the first electrode 18 and central electrode member 40 acts on the first liquid 14, whereby the first liquid 14 does not move and can be held at the position facing the central electrode member 40. As a result, a most part of the first liquid 14 faces the central electrode member 40, and parts of the first liquid 14 face the adjacent two electrode members 38 and 42.

Under this condition, as shown in FIG. 7B, the incident light traveling toward the adjustment chamber 32 is interrupted by the first liquid 14 positioned in the adjustment chamber 32 and having a low transmittance.

In this way, the adjustment chamber 32 is allowed to pass light therethrough by changing the position subject to the voltage application by the voltage application section 22 and dividing and moving the first liquid 14 from the adjustment chamber 32 to the two lay-by chambers 34. Furthermore, the first liquids 14 laid by in the two lay-by chambers 34 are moved and combined, whereby the adjustment chamber 32 interrupts light. As a result, the optical element 10 can be functioned as a shutter.

Next, a case will be described in which the optical element 10 is provided as a shutter in a shooting optical system of an imaging apparatus, such as a digital still camera and a video camera.

Figure 8:
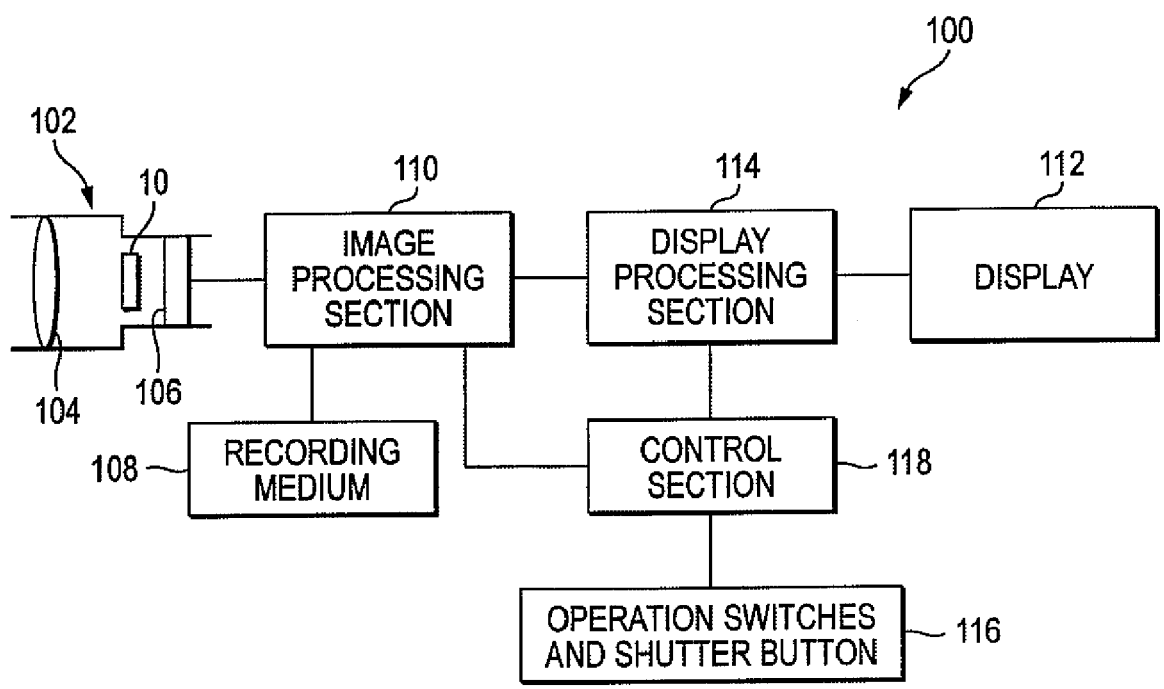
FIG. 8 is a block diagram showing a construction of an imaging apparatus 100.
Figure 9:
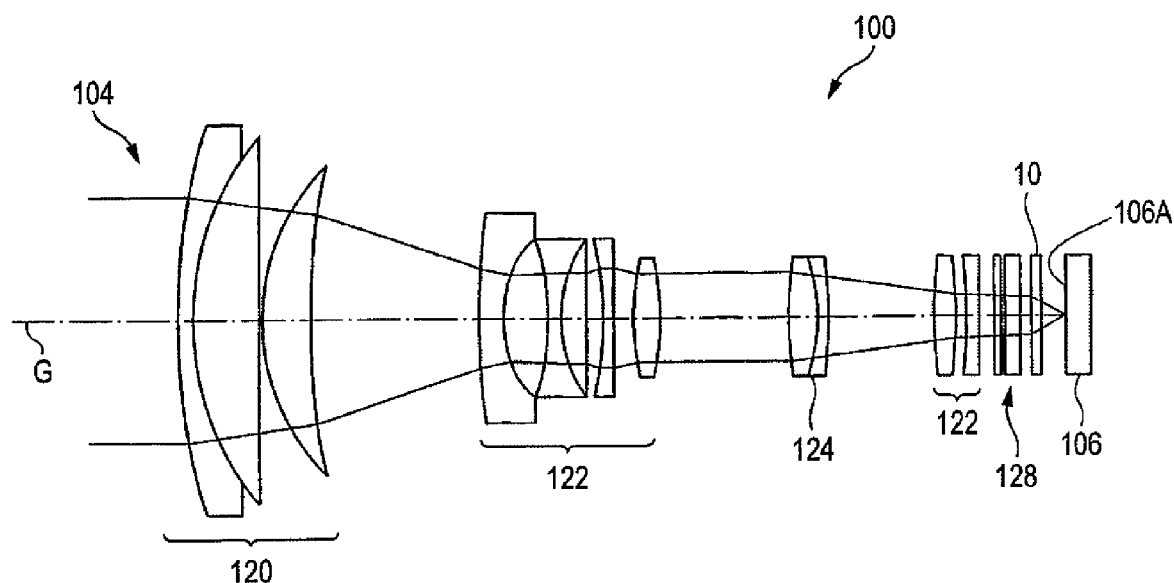
FIG. 9 is a diagram showing a construction of a shooting optical system 104 of the imaging apparatus 100.

FIG. 8 is a block diagram showing a construction of the imaging apparatus 100, and FIG. 9 is a diagram showing a construction of a shooting optical system 104 of the imaging apparatus 100.

As shown in FIG. 8, the imaging apparatus 100 has an external case, not shown, and the case has a lens barrel 102 built in and further has a display 112, a shutter button and operation switches 116 on the surface of the case. The operation switches 116 are used for performing various operations relating to and shooting.

The shooting optical system 104 and an imaging element 106 are mounted on the lens barrel 102. The imaging element 106 images a subject image captured by the shooting optical system 104.

The imaging apparatus 100 includes an image processing section 110, a display control section 114 and a control section 118. The image processing section 110 creates image data based on imaged signals output from the imaging element 106 and records it in a recording medium 108 such as a memory card. The display control section 114 causes the display 112 to display the image data. The control section 118 includes a CPU that controls the image processing section 110 and the display control section 114 in accordance with an operation on the shutter button and/or the operation switches 116.

As shown in FIG. 9, the shooting optical system 104 has, on an optical axis G, a first lens group 120, a second lens group 122, a third lens group 124, a fourth lens group 126 and a filter group 128 in order from a subject to the imaging element 106.

In this example, the first lens group 120 and third lens group 124 are not movable in the direction of the optical axis, and the second lens group 122 is movable in the direction of the optical axis as a zoom lens. The fourth lens group 126 is movable in the direction of the optical axis as a focus lens.

The pencils of light from a subject conducted by the first lens group 120 become parallel pencils of light by the second lens group 122, are conducted to the third lens group 124 and are converged to an imaging plane 106A of the imaging element 106 through the fourth lens group 126 and filter group 128.

The optical element 10 is placed between the filter group 128 and the imaging element 106, and the first liquid 14 is moved keeping the adjustment chamber 32 on the optical axis G and the direction that light passes through in parallel with the optical axis G. Thus, the first liquid 14 can interrupt the pencils of light to be conducted to the imaging element 106.

Therefore, in the optical element 10, when the pencils of light are interrupted by the moved first liquid 14, the time for the irradiation to the imaging plane 106A, that is, the exposure time of the imaging element 106 can be controlled.

Notably, the cross-sectional area of the pencils of light of the subject image converged by the shooting optical system 104 decreases as the distance between the shooting optical system 104 and the imaging plane 106A of the imaging element 106 decreases. Therefore, like in this embodiment, the cross-sectional area of the pencils of light opened and interrupted by the optical element 10 decreases when the optical element 10 is placed immediately before the imaging element 106A of the imaging element 106. Therefore, the travel of the first liquid 14 can be reduced, which is advantageous for the reduction of the size of the optical element 10 and the improvement of the response property.

As described above, according to this embodiment, the first liquid 14 held in the adjustment chamber 32 is divided by the electric field applied from the electrode members 38 and 42 in the lay-by chambers 34 and is moved to the lay-by chambers 34. Furthermore, the divided first liquids 14 held in the lay-by chambers 34 are moved and combined from the lay-by chambers 34 to the adjustment chamber 32 by the electric field applied from the electrode member 40 in the adjustment chamber 32.

Thus, since the divided first liquids 14 are moved, the mass and travel of the first liquids 14 can be reduced more than those in the case that the entire first liquid 14 is moved. Therefore, the speed of the movement of the first liquid 14 can be increased, which is advantageous for the improvement of the response property of the optical element 10.

Next, a comparison example will be described.

Figure 10A:
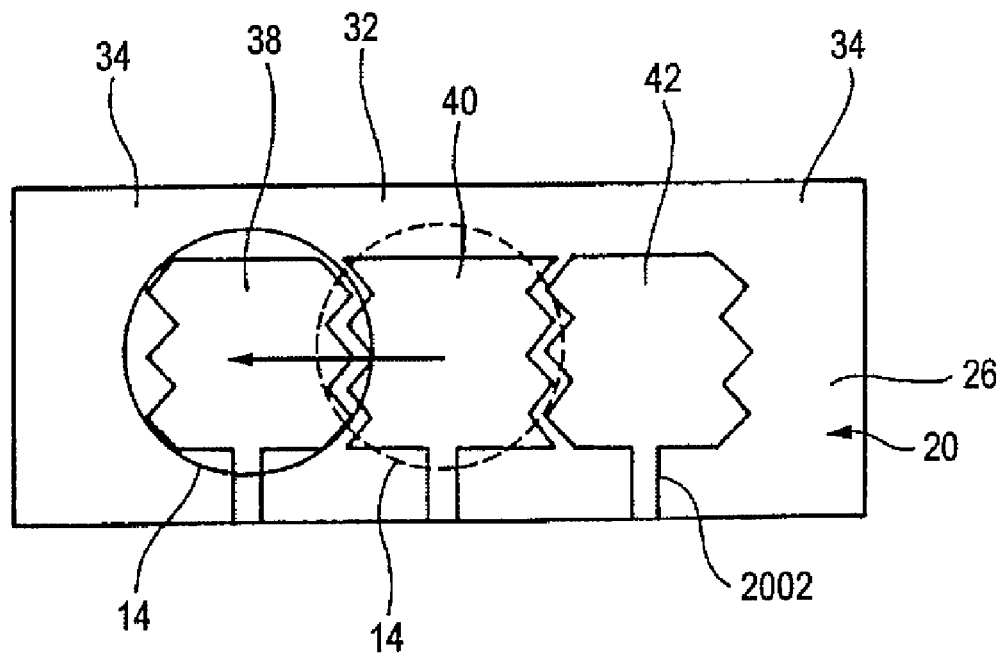
FIG. 10A is a diagram describing the movement of a first liquid 14 in a comparison example.
Figure 10B:
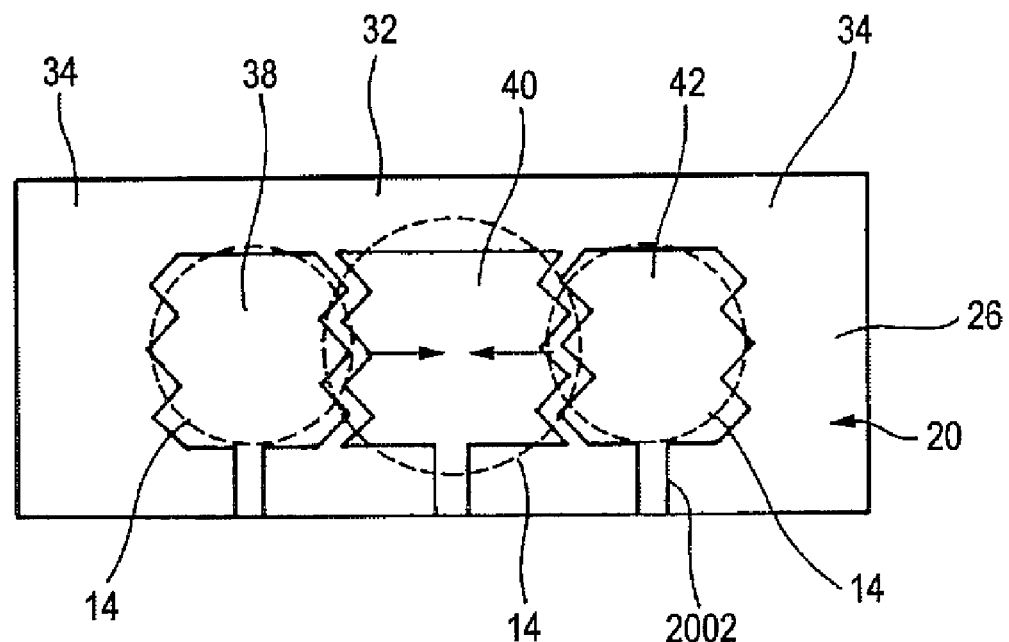
FIG. 10B is a diagram describing the movement of the first liquid 14 according to an embodiment.

FIG. 10A is a diagram describing a movement of the first liquid 14 in the comparison example, and FIG. 10B is a diagram describing the movement of the first liquid 14 according to this embodiment.

As shown in FIG. 10B, in the optical element 10 of this embodiment, the first liquid 14 is divided into two, which then move between the adjustment chamber 32 and the lay-by chambers 34.

As shown in FIG. 10A, in the optical element 10 in the comparison example, the first liquid 14 having an equal volume to that of the first liquid 14 in the optical element 10 according to this embodiment moves entirely between the adjustment chamber 32 and one of the lay-by chambers 34.

Thus, according to this embodiment, the volume and mass of the divided first liquids 14 are the half of the first liquid 14 in the comparison example if the volumes of the first liquids 14 are equal.

In the comparison example, the travel, which may be required by the first liquid 14 for moving on the adjacent electrode member, is substantially equal to the diameter (liquid diameter) of the first liquid 14.

On the other hand, according to this embodiment, the travel, which may be required by the divided first liquids 14 for moving onto the adjacent electrode members and combining, is substantially equal to the half of the travel in the comparison example.

According to this embodiment, since the volume of the divided first liquid 14 is the half of that in the comparison example, the diameter of the first liquid 14 is much smaller than that in the comparison example. Therefore, the travel that the first liquid 14 is to move is significantly reduced in comparison with the travel that the first liquid 14 to move in the comparison example.

If the electric fields to be applied thereto are identical, the movement speed increases as the mass of the first liquid 14 decreases.

Therefore, in the optical element 10 of this embodiment, the travel and mass of the first liquid 14 are smaller than those in the comparison example, which is advantageous for increasing the speed of the movement of the first liquid 14.

In this embodiment, the edges where the electrode members 38, 40 and 42 are adjacent to each other have the extension of the pits and projections 2010 in the direction orthogonal to the direction of the extension of the straight line, and the adjacent electrode members have the pits and projections 2010 in parallel and facing against each other.

Thus, even when the dimension of the space between the electrode members is equal to or slightly larger than the diameter of the first liquid 14, a part of the first liquid 14 in the direction of the movement can be faced against the adjacent electrode member keeping a most part of the first liquid 14 positioned at one of the electrode members, which is advantageous for increasing the spaces between electrode members.

Figure 11A:
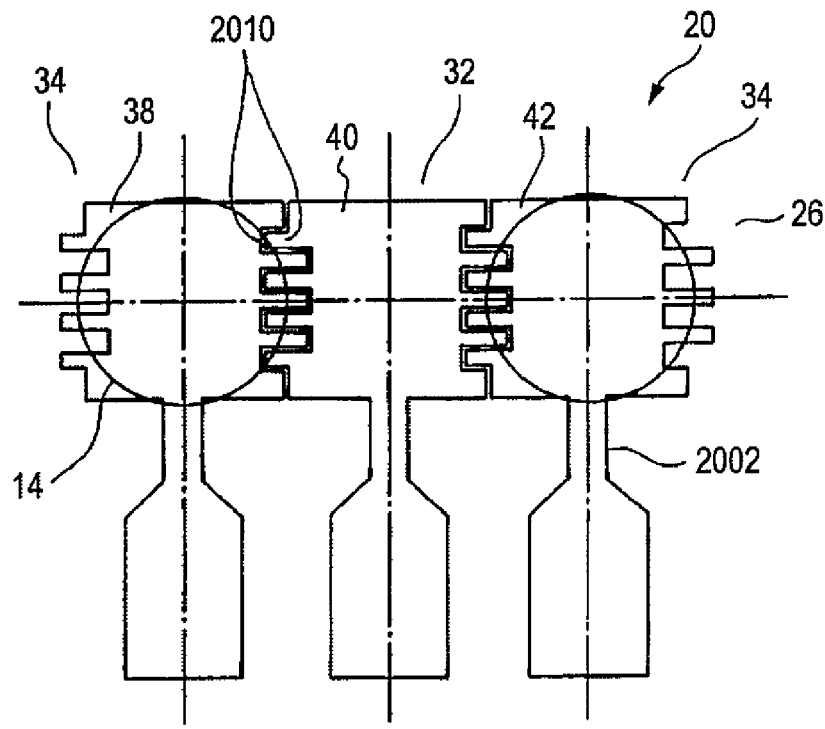
FIGS. 11A and 11B are plan views showing a variation example of a second electrode 20.

While the form of the pits and projections 2010 may be a triangular waveform having substantially uniform amplitudes like in this embodiment, the same effect as above can be apparently provided even when the form of the pits and projections 2010 is a square waveform having substantially uniform amplitudes, as shown in FIG. 11A.

Figure 11B:
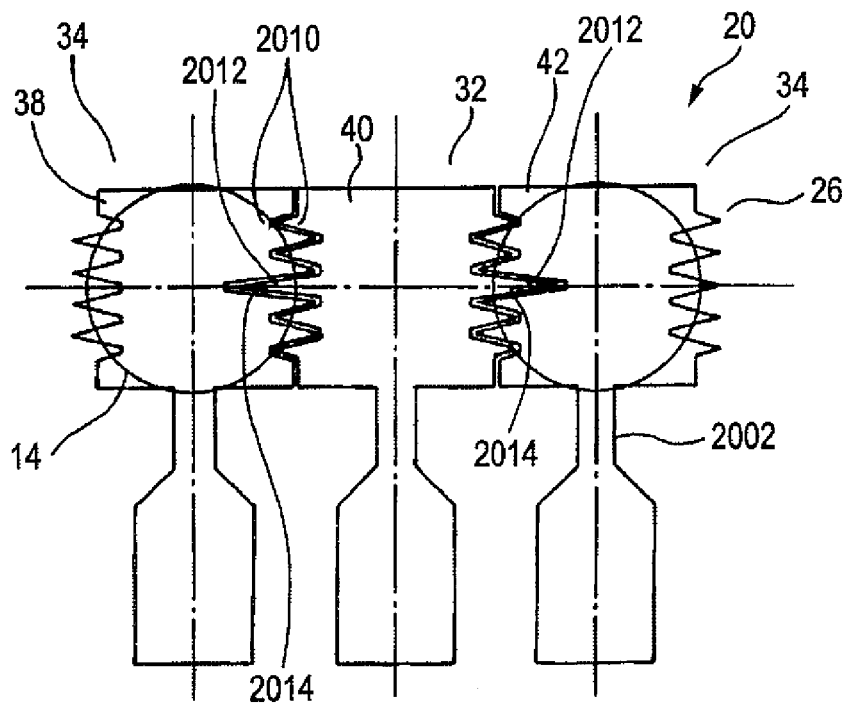

Furthermore, as shown in FIG. 11B, the electrode member 40 on the end wall 26 of the adjustment chamber 32 has projections 2012 at the center of the pits and projections 2010 in the direction of the extension. The projections 2012 more largely project toward the end wall 26 of the lay-by chambers 34 than the other projections of the pits and projections 2010. The electrode members 38 and 42 on the end wall 26 of the lay-by chambers 34 have pits 2014 at the center of the pits and projections 2010 in the direction of the extension. The pits 2014 more largely recess toward the center of the lay-by chambers 34 than other pits of the pits and projections 2010. The projections 2012 and pits 2014 spaced apart from and facing against each other provide following effects.

That is, when the first liquids 14 on the electrode members 38 and 42 in the lay-by chambers 34 move toward the electrode member 40 in the adjustment chamber 32, the pits 2012 have wider contact with the first liquids 14 than the other pits and projections 2010 of the central electrode member 40. Thus, an electric field can be strongly applied on the first liquids 14 from the projections 2012.

Hence, the center part of the first liquids 14 can be moved to the electrode member 40 in the adjustment chamber 32 earlier than the other parts. Therefore, the first liquids 14 can be moved more smoothly, which is advantageous for increasing the speed of the movement of the first liquid 14 from the lay-by chambers 34 to the adjustment chamber 32.

Notably, in order to apply an electric field to the first liquids 14, a part of the first liquids 14 may be only required to face the adjacent electrode member, keeping a most part of the first liquids 14 on one of the electrode members. Apparently, the pits and projections 2010 may not be provided at the positions where the electrode members 38, 40 and 42 are adjacent to each other, and the electrode members 38, 40 and 42 may be aligned straight in the direction orthogonal to the direction of the extension of the straight line. However, the existence of the pits and projections 2010 is advantageous for increasing the speed of the movement, as described above.

Second Embodiment

A second embodiment will be described next.

The second embodiment is different from the first embodiment in that the first liquid 14 is clear and the transmittance of the second liquid 16 is lower than the transmittance of the first liquid 14.

Figure 12:
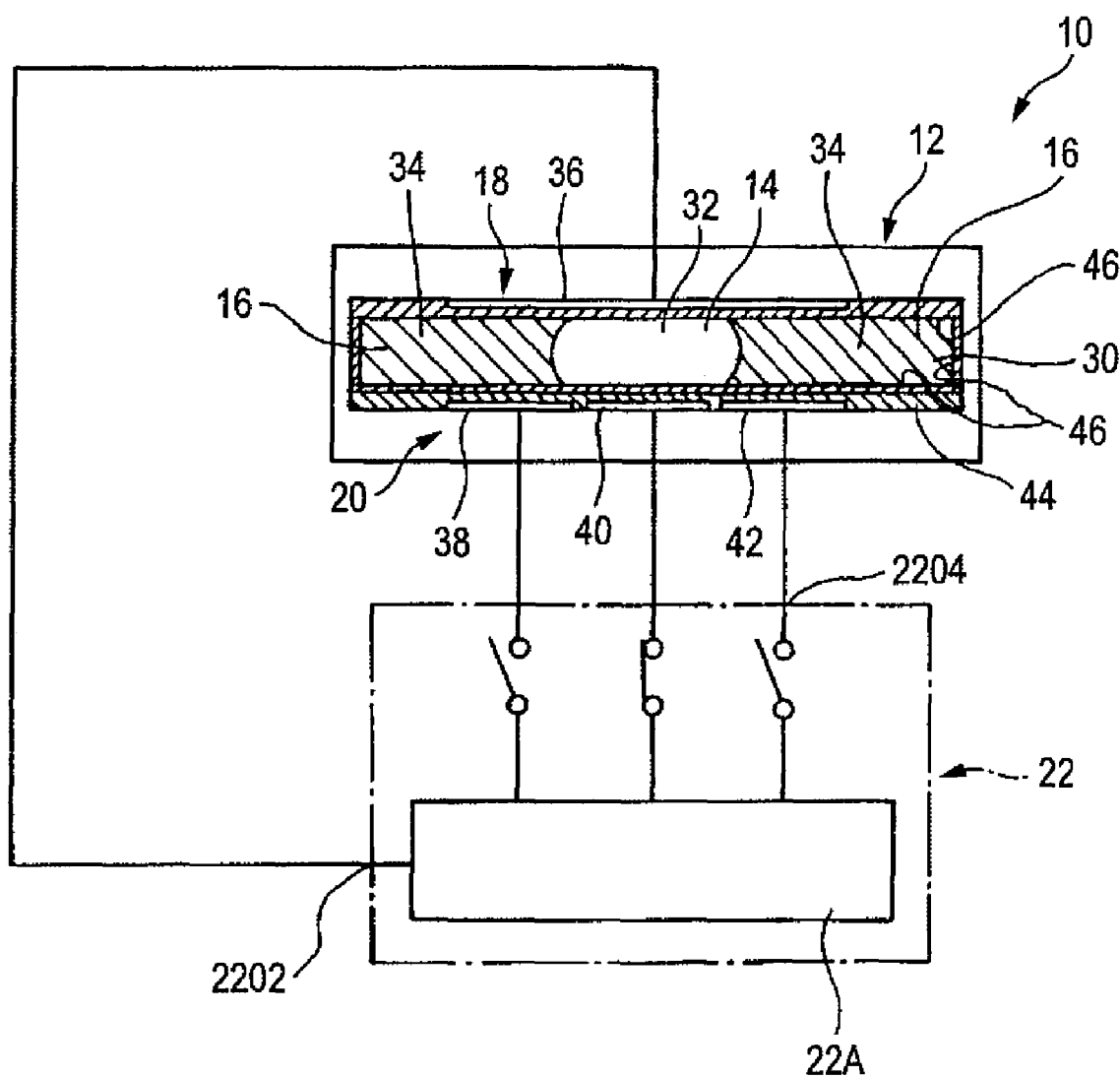
FIG. 12 is a longitudinal section diagram showing a construction of the optical element 10 according to a second embodiment.
Figure 13A:
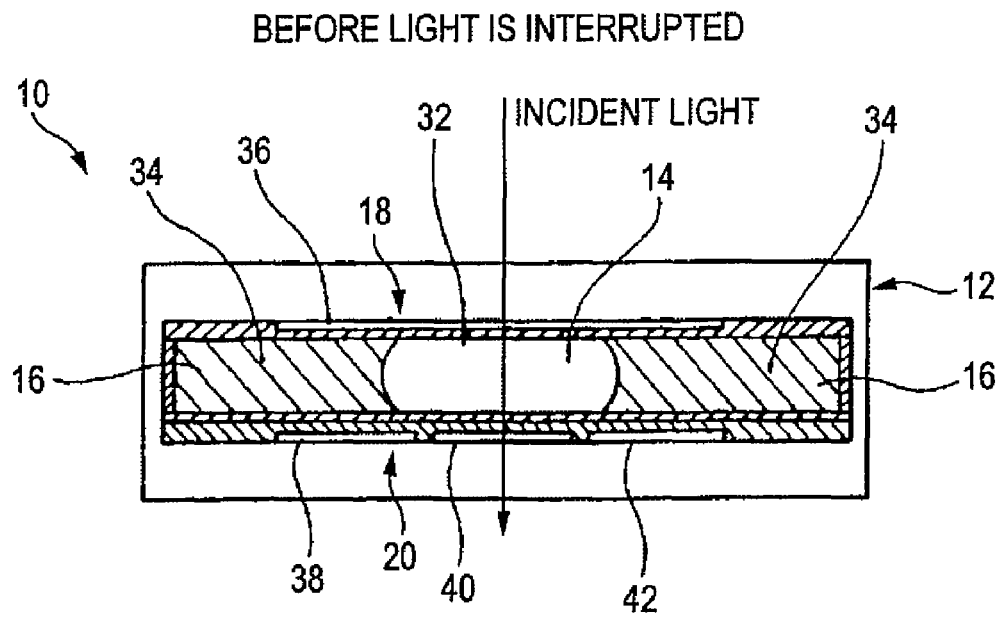
FIGS. 13A and 13B are explanatory diagrams describing an operation of the optical element 10 according to the second embodiment.
Figure 13B:
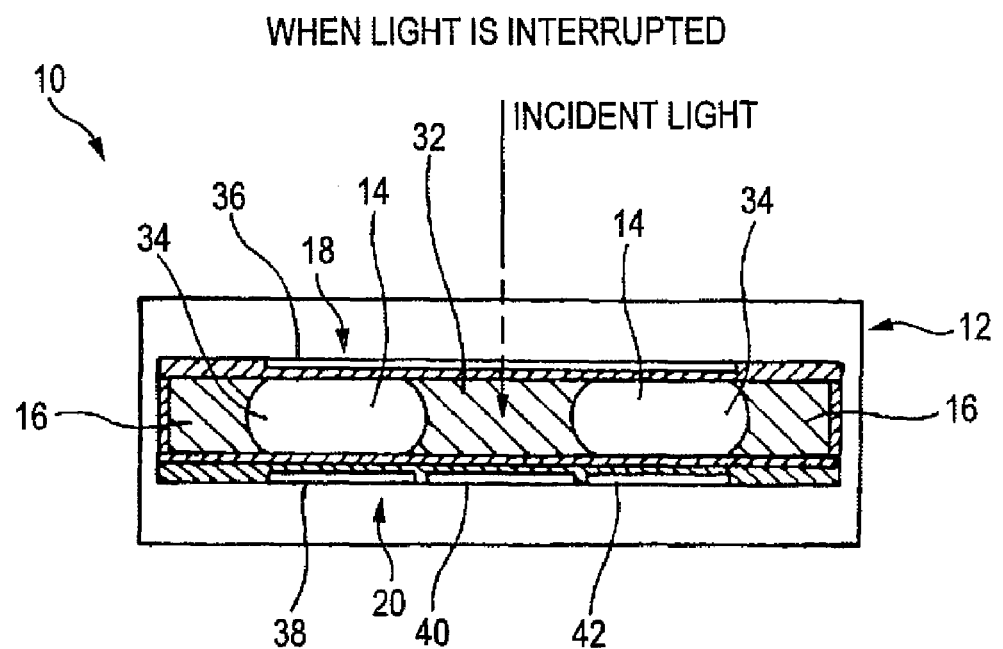

FIG. 12 is a longitudinal section diagram showing a construction of an optical element 10 of the second embodiment. FIGS. 13A and 13B are explanatory diagrams describing an operation of the optical element 10 of the second embodiment. The same reference numerals are given to the same or similar parts and components as those of the first embodiment in the following descriptions on this embodiment.

As shown in FIG. 12, the optical element 10 includes the container 12, the first liquid 14, the second liquid 16, the first electrode 18 and the second electrode 20, and the voltage application section 22, like the first embodiment.

The first liquid 14 is polar or conductive and is filled in the holding chamber 30.

The second liquid 16 does not mutually mix with the first liquid 14 and is filled around the first liquid 14 in the holding chamber 30.

The first liquid 14 and the second liquid 16 substantially have an equal specific gravity, and the transmittance of the second liquid 16 is lower than the transmittance of the first liquid 14.

According to this embodiment, the first liquid 14 is a liquid containing a mix of pure water, ethanol and ethylene glycol. The second liquid 16 is a clear silicon oil and contains fine particles containing a material that does not allow light to pass through.

The container 12, first electrode 18 and second electrode 20 and voltage application section 22 have the same constructions as those of the first embodiment.

Next, operations of the optical element 10 will be described.

First of all, an operation will be described in a case that the adjustment chamber 32 of the optical element 10 changes from the state that allows light to pass therethrough to the state that interrupts light.

As shown in FIGS. 12 and 13A, the first liquid 14 is initially positioned between the electrode member 36 of the first electrode 18 and the central electrode member 40 of the second electrode 20 in the adjustment chamber 32.

Under this state, the voltage application section 22 applies a voltage E to the central electrode member 40 and opens (or applies the ground potential to) the remaining two electrode members 38 and 42.

Thus, the electric field by the voltage E applied to the first electrode 18 and central electrode member 40 acts on the first liquid 14 facing the central electrode member 40, whereby the first liquid 14 does not move and can be held at the position. As a result, a most part of the first liquid 14 faces the central electrode member 40, and parts of the first liquid 14 face the adjacent two electrode members 38 and 42.

Under this condition, as shown in FIG. 13A, the incident light traveling toward the adjustment chamber 32 passes through the first liquid 14 positioned in the adjustment chamber 32 and having a high transmittance.

Next, the voltage application section 22 opens (or applies the ground potential to) the central electrode member 40 and applies the voltage E to the remaining two electrode members 38 and 42. In other words, the position subject to the voltage application to the second electrode 20 is changed to the remaining two electrode members 38 and 42.

Then, as shown in FIG. 13B, the electric field by the voltage E applied to the first electrode 18 and two electrode members 38 and 42 acts on the first liquid 14 facing the central electrode member 40, whereby the half of the first liquid 14 surrounded by the second liquid 16 moves toward one of the lay-by chambers 34, and, at the same time, the other half of the first liquid 14 moves toward the other lay-by chamber 34.

Thus, the first liquid 14 is divided into two, which are then held by the two lay-by chambers 34. Therefore, the half of the first liquid 14 is held in one of the lay-by chambers 34, and the remaining half of the first liquid 14 is held in the other lay-by chamber 34.

In this case, a most part of the one divided first liquid 14 faces the electrode member 38 on one side, and a part of the divided first liquid 14 faces the adjacent central electrode member 40. A most part of the other divided first liquid 14 faces the electrode member 42 on the other side, and a part of the other divided first liquid 14 faces the adjacent central electrode member 40.

Under this condition, as shown in FIG. 13B, the incident light traveling toward the adjustment chamber 32 is interrupted by the second liquid 16 positioned in the adjustment chamber 32 and having a low transmittance.

Next, an operation will be described in a case that the adjustment chamber 32 of the optical element 10 changes from the state that interrupts light to the state that allows light to pass therethrough, conversely to the above.

The divided first liquids 14 are held in the two lay-by chambers 34. Under this state, the voltage application section 22 applies the voltage E to the central electrode member 40 and opens (or applies the ground potential to) the remaining two electrode members 38 and 42.

Thus, as shown in FIG. 13B, the electric field by the voltage E applied to the first electrode 18 and central electrode member 40 acts on the divided first liquids 14 facing the two electrode members 38 and 42, whereby the divided first liquids 14 surrounded by the second liquid 16 move from the lay-by chambers 34 to the adjustment chamber 32.

Hence, as shown in FIG. 13A, the two divided first liquids 14 are held by and combined in the adjustment chamber 32.

Therefore, the electric field by the voltage E applied to the first electrode 18 and central electrode member 40 acts on the first liquid 14, whereby the first liquid 14 does not move and can be held at the position facing the central electrode member 40. As a result, a most part of the first liquid 14 faces the central electrode member 40, and parts of the first liquid 14 face the adjacent two electrode members 38 and 42.

Under this condition, as shown in FIG. 13A, the incident light traveling toward the adjustment chamber 32 is allowed to pass through the first liquid 14 positioned in the adjustment chamber 32 and having a low transmittance.

Like the first embodiment, the optical element 10 according to the second embodiment can be functioned as a shutter by switching the adjustment chamber 32 between the state that allows light to pass therethrough and the state that interrupts light by changing the position subject to the voltage application by the voltage application section 22 and dividing and moving the first liquid 14 between the adjustment chamber 32 and the two lay-by chambers 34.

Therefore, also according to this embodiment, the speed of the movement of the first liquid 14 can be increased, which is advantageous for the improvement of the response property of the optical element 10, like the first embodiment.

Third Embodiment

A third embodiment will be described next.

The third embodiment is different from the first embodiment in that the number of the lay-by chambers 34 is four and that the first liquid 14 is divided into four and is moved between the adjustment chamber 32 and the lay-by chambers 34.

Figure 14:
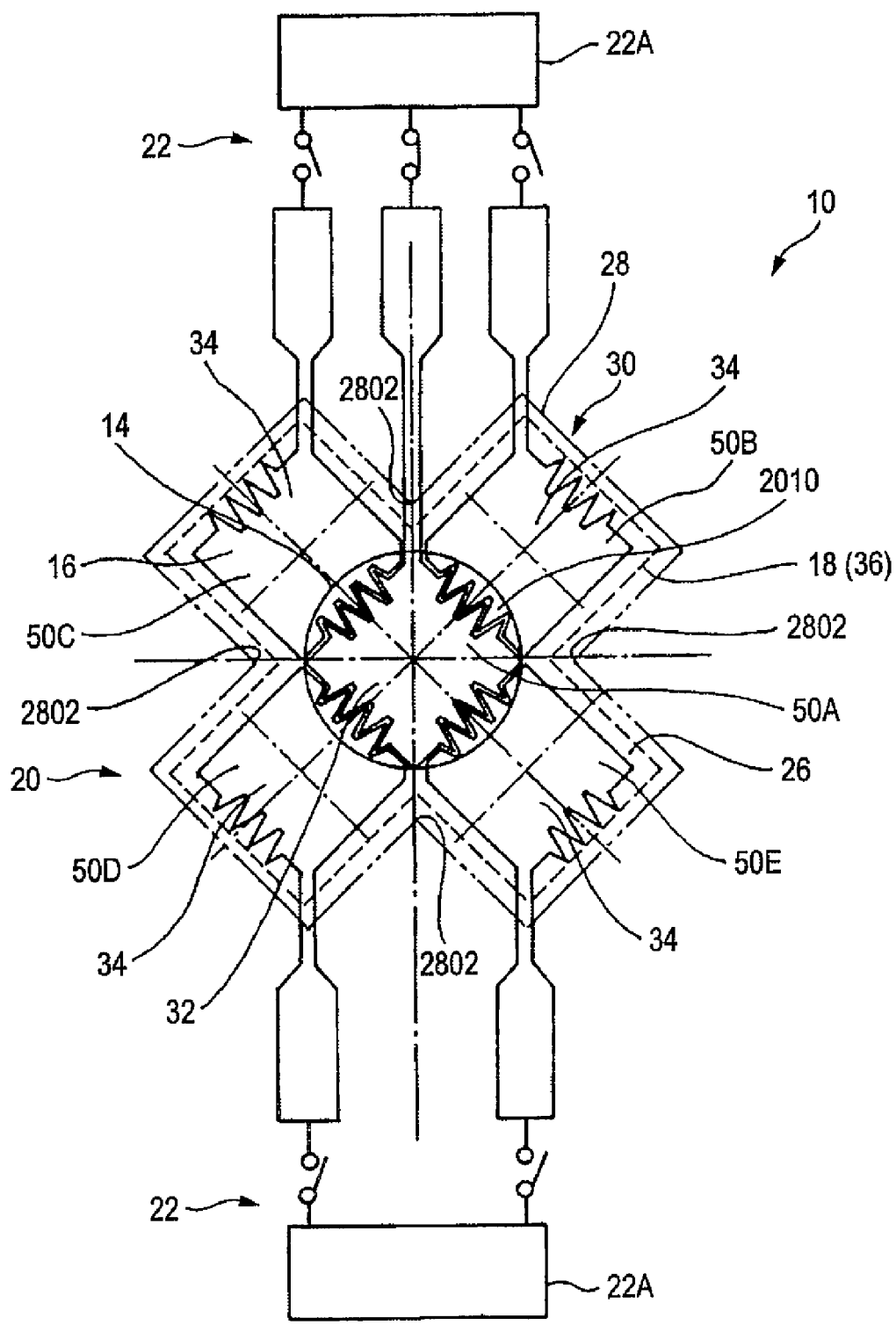
FIG. 14 is an explanatory diagram describing an operation of the optical element 10 according to a third embodiment.
Figure 15:
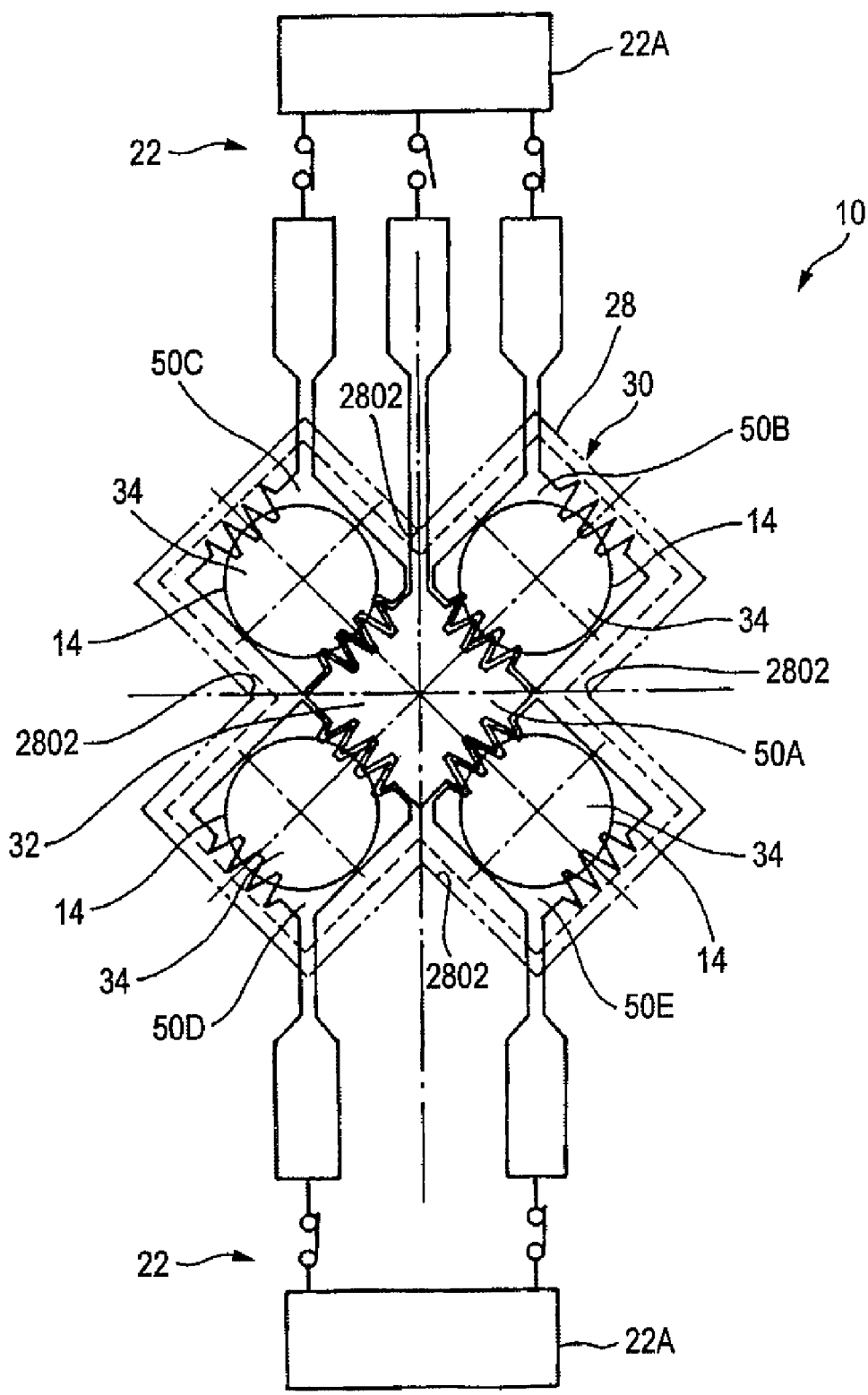
FIG. 15 is an explanatory diagram describing an operation of the optical element 10 according to the third embodiment.

FIGS. 14 and 15 are explanatory diagrams describing an operation of the optical element 10 according to the third embodiment and are plan views of the optical element 10.

As shown in FIG. 14, the four lay-by chambers 34 are aligned with an equal pitch (90 degrees) around the adjustment chamber 32 in the circumferential direction at the sight from the direction that light passes through.

In other words, the holding chamber 30 is crossshaped at the sight from the direction that light passes through, and the adjustment chamber 32 is positioned at the center of the cross shape. Two of the four lay-by chambers 34 are provided on a straight line extending in the direction orthogonal to the direction that light passes through on both sides of the adjustment chamber 32. The remaining two lay-by chambers 34 are provided on another straight line orthogonal to the straight line in the direction orthogonal to the direction that light passes through on both sides of the adjustment chamber 32.

The adjustment chamber 32 and four lay-by chambers 34 include a first end wall (not shown) and a second end wall 26, which face against each other in the direction that light passes through.

The four lay-by chambers 34 further include side walls 28 connecting the first and second end walls. In each of the lay-by chambers 34, the first and second end walls are divided by the side wall 28 excluding the parts connecting to the adjustment chamber 32.

Then, the side walls 28 of the adjacent lay-by chambers 34 form a corner 2802 extending between the first and second end walls at the position connecting to the adjustment chamber 32. According to this embodiment, the corner 2802 makes a right angle.

According to the third embodiment, like the first embodiment, the first liquid 14 and the second liquid 16 substantially have an equal specific gravity, and the transmittance of the first liquid 14 is lower than the transmittance of the second liquid 16. The second liquid 16 is filled around the first liquid 14 in the holding chamber 30.

As shown in FIG. 14, the first electrode 18 is provided on the first end wall of the adjustment chamber 32 and four lay-by chambers 34. The first electrode 18 includes a single electrode member 36 extending across the first end wall of the adjustment chamber 32 and four lay-by chambers 34. According to this embodiment, the electrode member 36 has a cross shape having one-size-smaller contours than the contours of the first end wall.

The second electrode 20 is provided on the second end wall 26 of the adjustment chamber 32 and four lay-by chambers 34. According to this embodiment, the second electrode 20 includes five electrode members 50A, 50B, 50C, 50D and 50E in a same form and a same size, which are separated from each other. The one electrode member 50A of the five electrode members is provided on the second end wall 26 of the adjustment chamber 32, and the remaining four electrode members 50B, 50C, 50D and 50E are provided on the second end wall 26 of the four lay-by chambers 34.

The edges where the central electrode member 50A and the four electrode members 50B, 50C, 50D and 50E are adjacent to each other have pits and projections 2010 extending in the direction orthogonal to the direction of the extension of the straight lines. The adjacent electrode members are placed with the pits and projections 2010 parallel to, spaced apart from and facing against each other.

The voltage application section 22 supplies the ground potential to the first electrode 18 and is configured to be capable of applying the voltage E selectively to each of the five electrode members 50A, 50B, 50C, 50D and 50E of the second electrode 20.

Next, operations of the optical element 10 will be described.

First of all, an operation will be described in a case that the adjustment chamber 32 of the optical element 10 changes from the state that interrupts light to the state that allows light to pass therethrough.

As shown in FIG. 14, the first liquid 14 is initially positioned between the electrode member 36 of the first electrode 18 and the central electrode member 50A of the second electrode 20 in the adjustment chamber 32.

Under this state, the voltage application section 22 applies the voltage E to the central electrode member 50A and opens (or applies the ground potential to) the remaining four electrode members 50B, 50C, 50D and 50E.

Thus, the electric field by the voltage E applied to the first electrode 18 and central electrode member 50A acts on the first liquid 14 facing the central electrode member 50A, whereby the first liquid 14 does not move and can be held at the position. As a result, a most part of the first liquid 14 faces the central electrode member 50A, and parts of the first liquid face the adjacent four electrode members 50B, 50C, 50D and 50E.

Under this condition, the incident light traveling toward the adjustment chamber 32 is interrupted by the first liquid 14 positioned in the adjustment chamber 32 and having a low transmittance.

Next, as shown in FIG. 15, the voltage application section 22 opens (or applies the ground potential to) the central electrode member 50A and applies the voltage E to the remaining four electrode members 50B, 50C, 50D and 50E. In other words, the position subject to the voltage application to the second electrode 20 is changed to the remaining four electrode members 50B, 50C, 50D and 50E.

Then, the electric field by the voltage E applied to the first electrode 18 and four electrode members 50B, 50C, 50D and 50E acts on the first liquid 14 facing the central electrode member 50A, whereby the first liquid 14 surrounded by the second liquid 16 is divided into four and moves toward the four lay-by chambers 34.

Thus, the first liquid 14 is divided into four, which are then held by the four lay-by chambers 34.

In this case, most parts of the divided first liquids 14 face the respective four electrode members 50B, 50C, 50D and 50E, and parts of the divided first liquids 14 face the adjacent central electrode member 50A.

Under this condition, the incident light traveling toward the adjustment chamber 32 passes through the second liquid 16 positioned in the adjustment chamber 32 and having a high transmittance.

Next, an operation will be described in a case that the adjustment chamber 32 of the optical element 10 changes from the state that allows light to pass therethrough to the state that interrupts light, conversely to the above.

As shown in FIG. 15, the divided first liquids 14 are held in the four lay-by chambers 34. Under this state, the voltage application section 22 applies the voltage E to the central electrode member 50A and opens (or applies the ground potential to) the remaining four electrode members 50B, 50C, 50D and 50E.

Thus, the electric field by the voltage E applied to the first electrode 18 and central electrode member 50A acts on the first liquids 14 facing the four electrode members 50B, 50C, 50D and 50E, whereby the divided first liquids 14 surrounded by the second liquid 16 move from the lay-by chambers 34 to the adjustment chamber 32.

Hence, as shown in FIG. 14, the four divided first liquids 14 are held by and combined in the adjustment chamber 32.

Therefore, the electric field by the voltage E applied to the first electrode 18 and central electrode member 50A acts on the first liquid 14, whereby the first liquid 14 does not move and can be held at the position facing the central electrode member 50A. As a result, a most part of the first liquid 14 faces the central electrode member 50A, and parts of the first liquid 14 face the adjacent four electrode members 50B, 50C, 50D and 50E.

Under this condition, the incident light traveling toward the adjustment chamber 32 is interrupted by the first liquid 14 positioned in the adjustment chamber 32 and having a low transmittance.

Like the first embodiment, the optical element 10 according to the third embodiment can be functioned as a shutter by switching the adjustment chamber 32 between the state that allows light to pass therethrough and the state that interrupts light by changing the position subject to the voltage application by the voltage application section 22 and dividing and moving the first liquid 14 between the adjustment chamber 32 and the four lay-by chambers 34.

According to the third embodiment in particular, since the first liquid 14 is divided into four, the speed of the movement of the first liquid 14 can be increased more than that of the first embodiment, which is advantageous for the improvement of the response property of the optical element 10.

Furthermore, according to the third embodiment, since the four corners 2802 face the holding chamber 30, the first liquid 14 can be smoothly divided by separating the first liquid by the corners 2802 when the first liquid 14 held in the adjustment chamber 32 is divided and moved to the lay-by chambers 34, which is advantageous for the increase in movement speed of the first liquid 14.

Notably, the first liquid 14 can be divided and moved even when the holding chamber 30 does not have the corners 2802. However, the existence of the corners 2802 is more advantageous for the increase in movement speed of the first liquid 14 as described above than the case without the corners 2802.

Fourth Embodiment

A fourth embodiment will be described next.

The fourth embodiment is a variation example of the third embodiment and is different from the third embodiment in the operation for dividing the first liquid 14 into two while the construction is identical to that of the third embodiment.

Figure 16A:
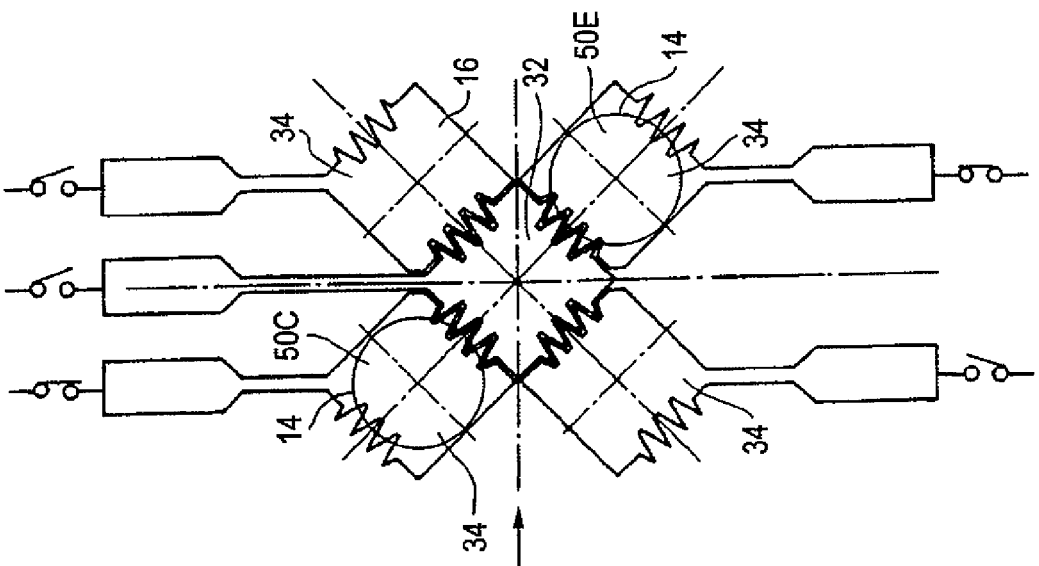
FIGS. 16A to 16C are explanatory diagrams describing an operation of the optical element 10 according to a fourth embodiment.
Figure 16B:
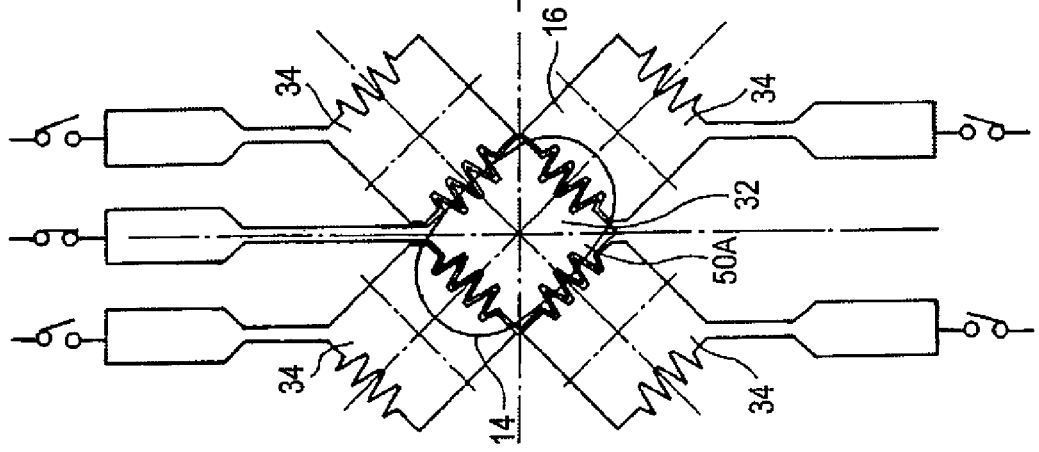
Figure 16C:
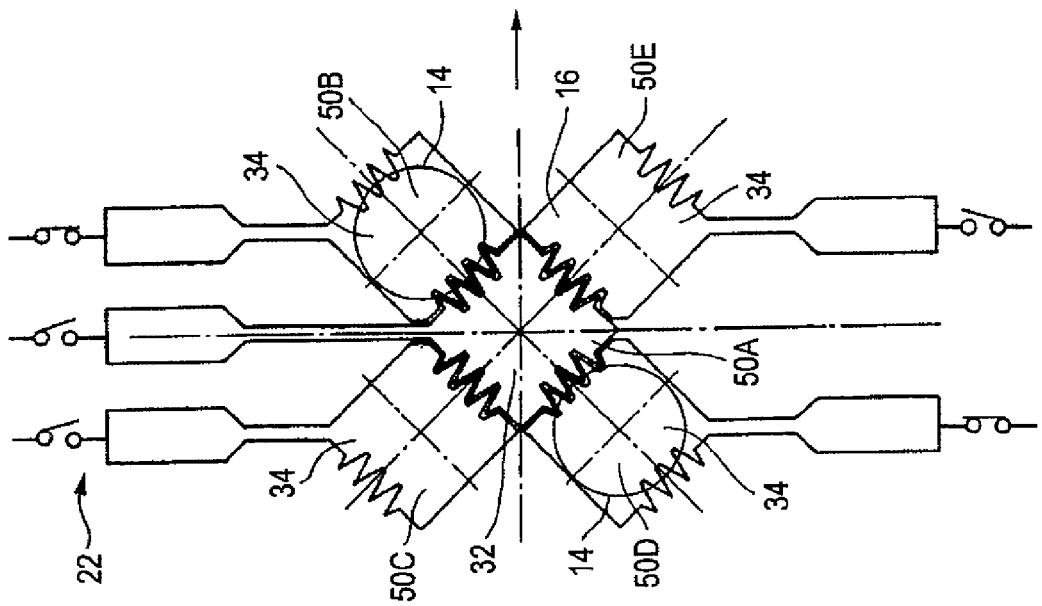

FIGS. 16A, 16B and 16C are explanatory diagrams describing an operation of the optical element 10 according to the fourth embodiment.

As shown in FIG. 16A, the voltage application section 22 applies the voltage E to the electrode members 50B and 50D of the facing two lay-by chambers 34, which opens (or applies the ground potential to) the electrode members 50C and 50E in the remaining two lay-by chambers 34 and the central electrode member 50A. Then, the first liquid 14 is divided into two, which are then held in the two facing lay-by chambers 34.

Under this condition, the incident light traveling toward the adjustment chamber 32 passes through the second liquid 16 positioned in the adjustment chamber 32 and having a high transmittance.

Next, the voltage application section 22 applies the voltage E to the central electrode member 50A and opens (or applies the ground potential to) the remaining four electrode members 50B, 50C, 50D and 50E.

Thus, as shown in FIG. 16B, the first liquids 14 surrounded by the second liquid 16 in the facing two lay-by chambers 34 move from the lay-by chambers 34 to the adjustment chamber 32. Then, the first liquids 14 are held by and combined in the adjustment chamber 32.

Under this condition, the incident light traveling toward the adjustment chamber 32 is interrupted by the first liquid 14 positioned in the adjustment chamber 32 and having a low transmittance.

Since the two first liquids 14 brought into contact with each other are combined, the force acting on each of the first liquids 14 deforms the combined first liquid 14 to a form stretched along the straight line orthogonal to the straight line connecting the facing two lay-by chambers 34, that is, along the straight line connecting the remaining two lay-by chambers 34, as indicated by the chain double-dashed lines in FIG. 16B.

With the deformation, the voltage application section 22 applies the voltage E to the electrode members 50C and 50 E in the remaining two lay-by chambers 34 and opens (or applies the ground potential to) the electrode members 50B and 50D in the two lay-by chambers 34 and the central electrode member 50A. Thus, the first liquid 14 is divided into two by the action of the electric field by the voltage E applied to the electrode members 50C and 50E in the remaining two lay-by chambers 34, which are then moved to and held by the remaining two lay-by chambers 34, as shown in FIG. 16C.

Under this condition, the incident light traveling toward the adjustment chamber 32 passes through the second liquid 16 positioned in the adjustment chamber 32 and having a high transmittance.

According to the fourth embodiment, after the first liquids 14 are moved from the facing two lay-by chambers 34 to the adjustment chamber 32 and are combined and deformed therein, the first liquids 14 are moved to the remaining two lay-by chambers 34 in the direction of the deformation. Thus, after the first liquid 14 is moved from the two facing lay-by chambers to the adjustment chamber 32, the first liquid 14 can be quickly moved to the remaining two lay-by chambers 34. Therefore, the period of time when the first liquid 14 stays in the adjustment chamber 32 can be reduced, which is advantageous for the increase in speed of the operation for interrupting the optical path by the optical element 10.

Fifth Embodiment

A fifth embodiment will be described next.

The fifth embodiment is another variation example of the third embodiment, and the number of lay-by chambers 34 is eight, and the first liquid 14 is divided into eight.

Figure 17A:
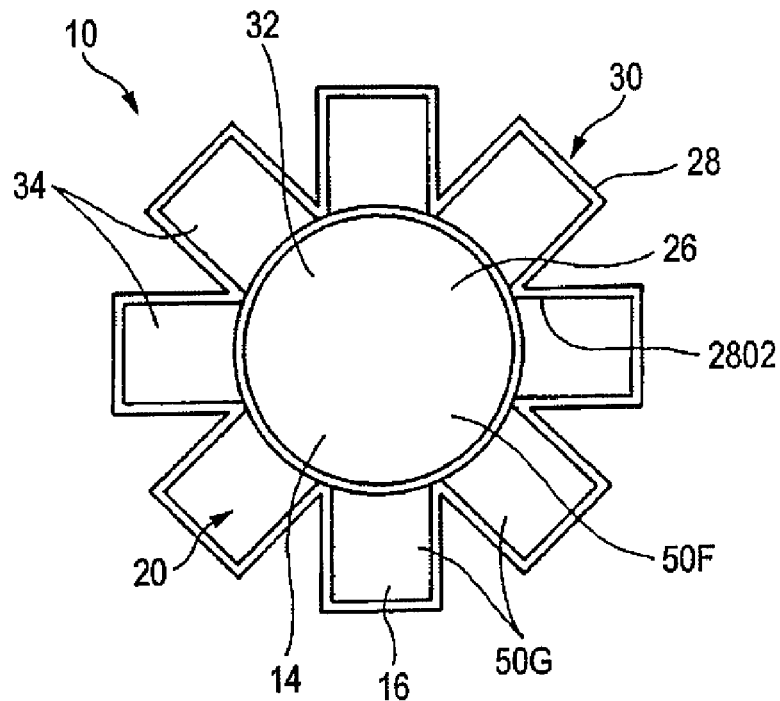
FIGS. 17A and 17B are explanatory diagrams describing an operation of the optical element 10 according to a fifth embodiment.
Figure 17B:
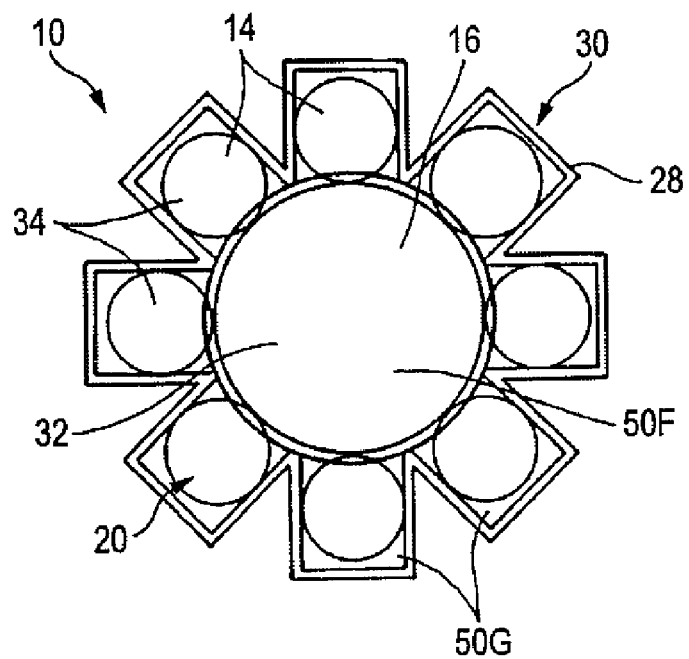
Figure 18:
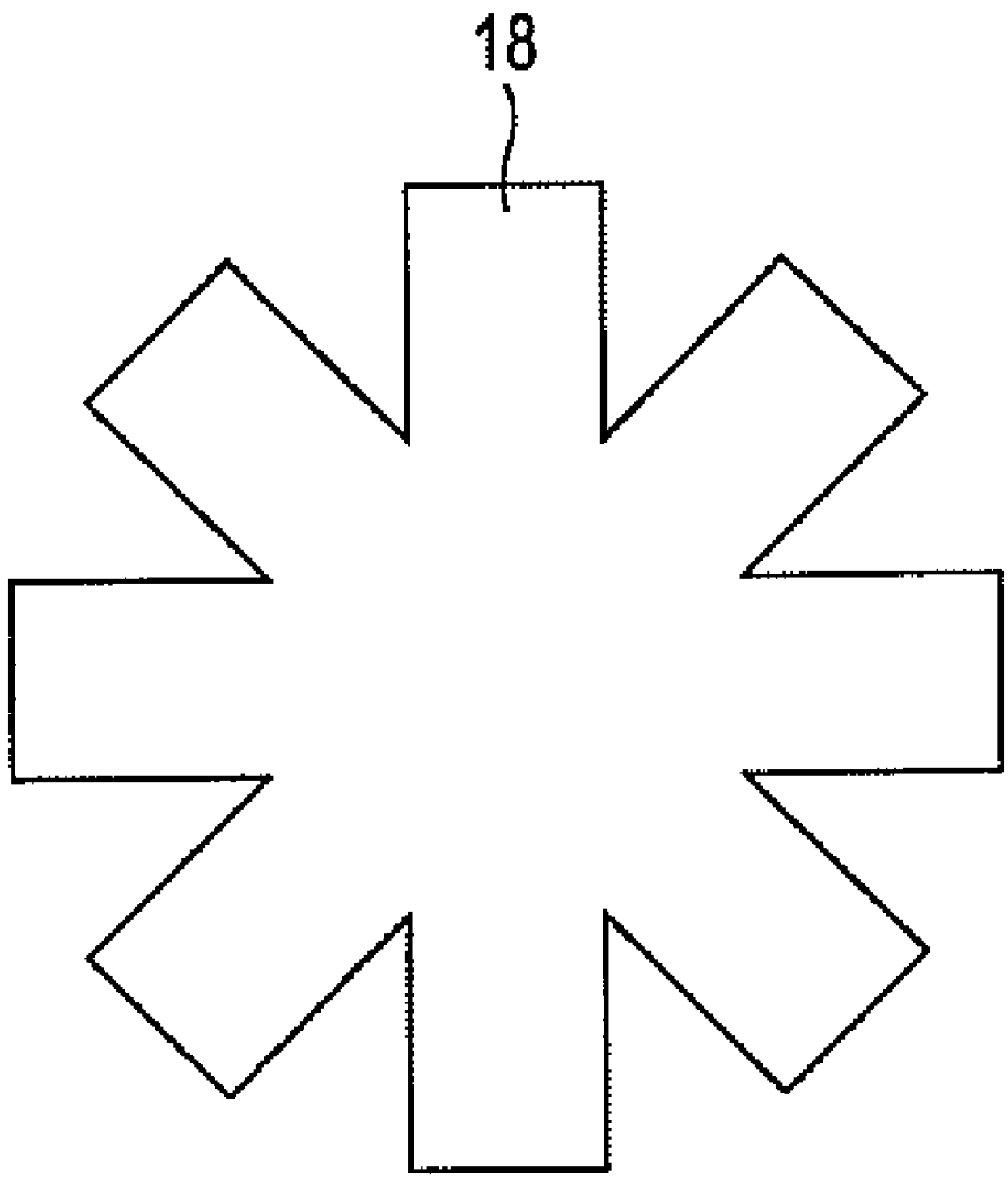
FIG. 18 is a plan view of a first electrode 18.

FIGS. 17A and 17B are explanatory diagrams describing an operation of the optical element 10 according to the fifth embodiment, and FIG. 18 is a plan view of the first electrode 18.

As shown in FIG. 17A, the optical element 10 includes the holding chamber 30, and the holding chamber 30 includes the adjustment chamber 32 and the eight lay-by chambers 34 equally spaced apart around the perimeter of the adjustment chamber 32.

The adjustment chamber 32 and eight lay-by chambers 34 include a first end wall (not shown) and a second end wall 26, which face against each other in the direction that light passes through.

The eight lay-by chambers 34 further include side walls 28 connecting the first and second end walls. In each of the lay-by chambers 34, the first and second end walls are divided by the side wall 28 excluding the part connecting to the adjustment chamber 32.

Then, the side walls 28 of the adjacent lay-by chambers 34 form a corner 2802 extending between the first and second end walls at the part connecting to the adjustment chamber 32. According to this embodiment, each of the corners 2802 makes an acute angle.

According to the fifth embodiment, like the first embodiment, the first liquid 14 and the second liquid 16 substantially have an equal specific gravity, and the transmittance of the first liquid 14 is lower than the transmittance of the second liquid 16. The second liquid 16 is filled around the first liquid 14 in the holding chamber 30.

As shown in FIG. 18, the first electrode 18 is provided on the first end wall of the adjustment chamber 32 and eight lay-by chambers 34. The first electrode 18 includes a single electrode member 36 extending across the first end wall of the adjustment chamber 32 and eight lay-by chambers 34. According to this embodiment, the electrode member 36 has one-size-smaller contours than the contours of the first end wall.

As shown in FIG. 17A, the second electrode 20 is provided on the second end wall 26 of the adjustment chamber 32 and eight lay-by chambers 34. According to this embodiment, the second electrode 20 includes nine electrode members, which are separated from each other. One electrode member 50F of them is provided on the second end wall 26 of the adjustment chamber 32, and the remaining eight electrode members 50G in a same form and a same size are provided on the second end wall 26 of the eight lay-by chambers 34.

The voltage application section 22 supplies the ground potential to the first electrode 18 and is configured to be capable of applying the voltage E selectively to each of the nine electrode members 50F and 50G of the second electrode 20.

Next, operations of the optical element 10 will be described.

First of all, an operation will be described in a case that the adjustment chamber 32 of the optical element 10 changes from the state that interrupts light to the state that allows light to pass therethrough.

As shown in FIG. 17A, the first liquid 14 is initially positioned between the electrode member 36 of the first electrode 18 and the central electrode member 50F of the second electrode 20 in the adjustment chamber 32.

Under this state, the voltage application section 22 applies the voltage E to the central electrode member 50F and opens (or applies the ground potential to) the remaining eight electrode members 50G.

Thus, the electric field by the voltage E applied to the first electrode 18 and central electrode member 50F acts on the first liquid 14 facing the central electrode member 50F, whereby the first liquid 14 does not move and can be held at the position. As a result, a most part of the first liquid 14 faces the central electrode member 50F, and parts of the first liquid 14 face the adjacent eight electrode members 50G.

Under this condition, the incident light traveling toward the adjustment chamber 32 is interrupted by the first liquid 14 positioned in the adjustment chamber 32 and having a low transmittance.

Next, the voltage application section 22 opens (or applies the ground potential to) the central electrode member 50F and applies the voltage E to the remaining eight electrode members 50G. In other words, the position subject to the voltage application to the second electrode 20 is changed to the remaining eight electrode members 50G.

Then, the electric field by the voltage E applied to the first electrode 18 and eight electrode members 50G acts on the first liquid 14 facing the central electrode member 50F, whereby the first liquid 14 surrounded by the second liquid 16 is divided into eight, which then move toward the eight lay-by chambers 34, as shown in FIG. 17B.

Thus, the first liquid 14 is divided into eight, which are then held by the eight lay-by chambers 34.

In this case, a most part of the divided first liquid 14 faces the eight electrode members 50G, and parts of the first liquid 14 face the adjacent central electrode member 50F.

Under this condition, the incident light traveling toward the adjustment chamber 32 passes through the second liquid 16 positioned in the adjustment chamber 32 and having a high transmittance.

Next, an operation will be described in a case that the adjustment chamber 32 of the optical element 10 changes from the state that allows light to pass therethrough to the state that interrupts light, conversely to the above.

As shown in FIG. 17B, the divided first liquids 14 are held in the eight lay-by chambers 34. Under this state, the voltage application section 22 applies the voltage E to the central electrode member 50F and opens (or applies the ground potential to) the remaining eight electrode members 50G.

Thus, the electric field by the voltage E applied to the first electrode 18 and central electrode member 50F acts on the first liquids 14 facing the eight electrode members 50G, whereby the divided first liquids 14 surrounded by the second liquid 16 move from the lay-by chambers 34 to the adjustment chamber 32.

Hence, as shown in FIG. 17A, the eight divided first liquids 14 are held by and combined in the adjustment chamber 32.

Therefore, the electric field by the voltage E applied to the first electrode 18 and central electrode member 50F acts on the first liquid 14, whereby the first liquid 14 does not move and can be held at the position facing the central electrode member 50F. As a result, a most part of the first liquid 14 faces the central electrode member 50F, and parts of the first liquid 14 face the adjacent eight electrode members 50G.

Under this condition, the incident light traveling toward the adjustment chamber 32 is interrupted by the first liquid 14 positioned in the adjustment chamber 32 and having a low transmittance.

Like the first embodiment, the optical element 10 according to the fifth embodiment can be functioned as a shutter by switching the adjustment chamber 32 between the state that allows light to pass therethrough and the state that interrupts light by dividing and moving the first liquid 14 between the adjustment chamber 32 and the eight lay-by chambers 34.

According to the fifth embodiment in particular, since the first liquid 14 is divided into eight, the speed of the movement of the first liquid 14 can be increased more than that of the first embodiment in which the first liquid 14 is divided into two or the third embodiment in which the first liquid 14 is divided into four. This is advantageous for the improvement of the response property of the optical element 10.

Furthermore, since the eight corners 2802 face the holding chamber 30, the first liquid 14 can be smoothly divided by separating the first liquid 14 by the corners 2802 when the first liquid 14 held in the adjustment chamber 32 is divided and moved to the lay-by chambers 34, like the third embodiment, which is advantageous for the increase in movement speed of the first liquid 14.

Sixth Embodiment

A sixth embodiment will be described next.

According to the sixth embodiment, for the improvement of the response property, the first liquid 14 is divided in two steps, and the divided first liquids 14 are combined in one step.

Figure 19:
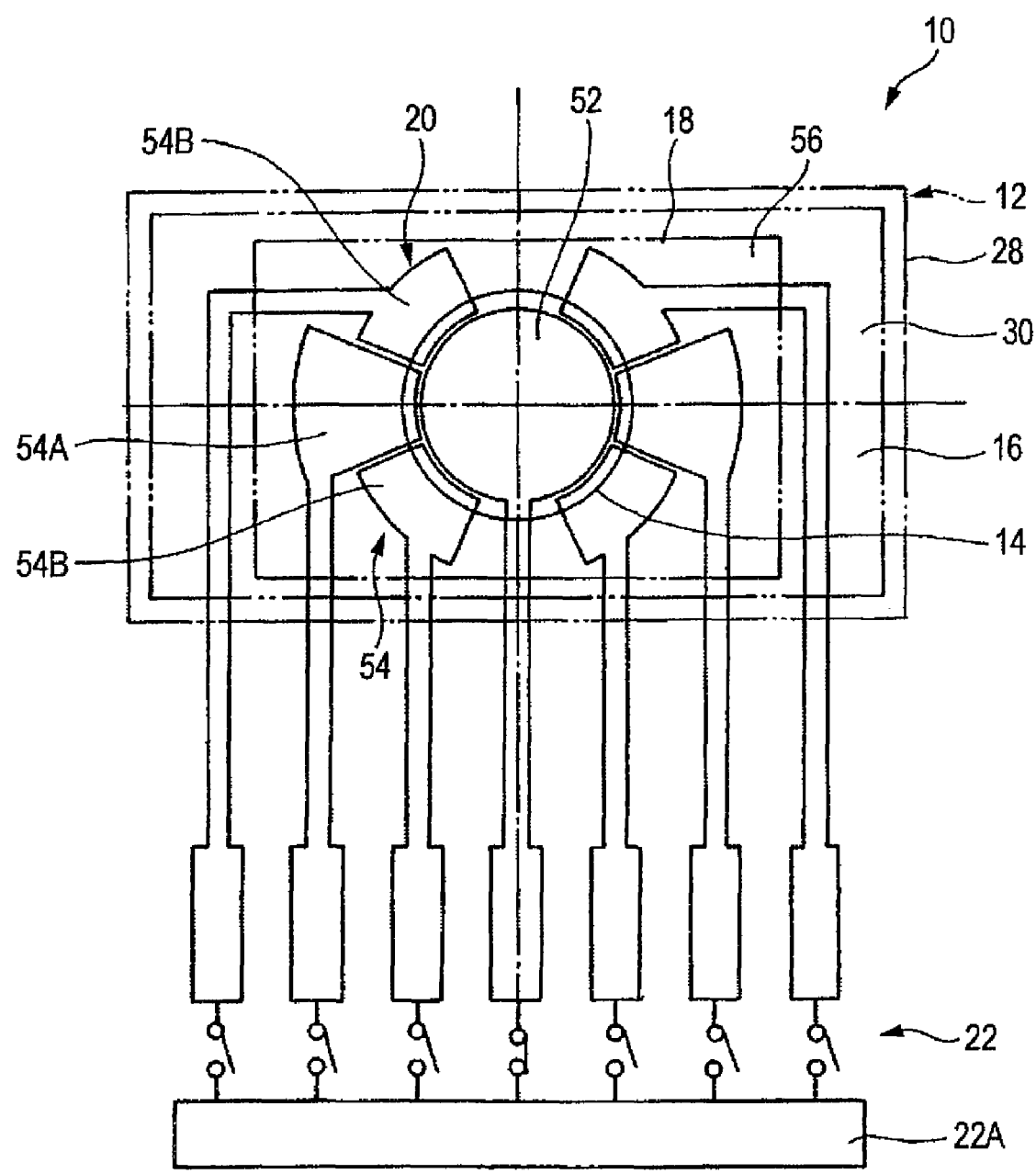
FIG. 19 is an explanatory diagram describing an operation of the optical element 10 according to a sixth embodiment.
Figure 20:
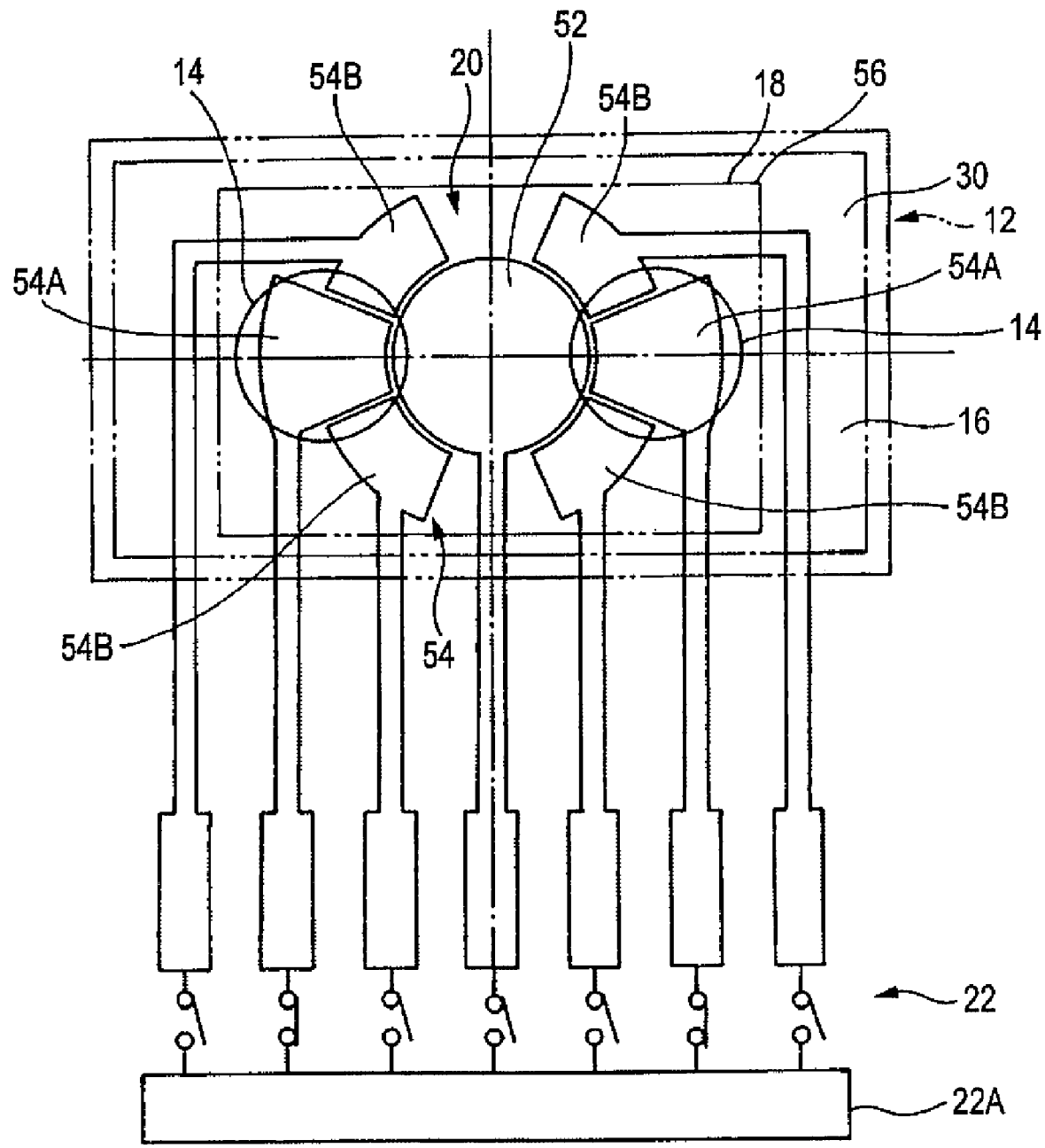
FIG. 20 is an explanatory diagram describing an operation of the optical element 10 according to the sixth embodiment.
Figure 21:
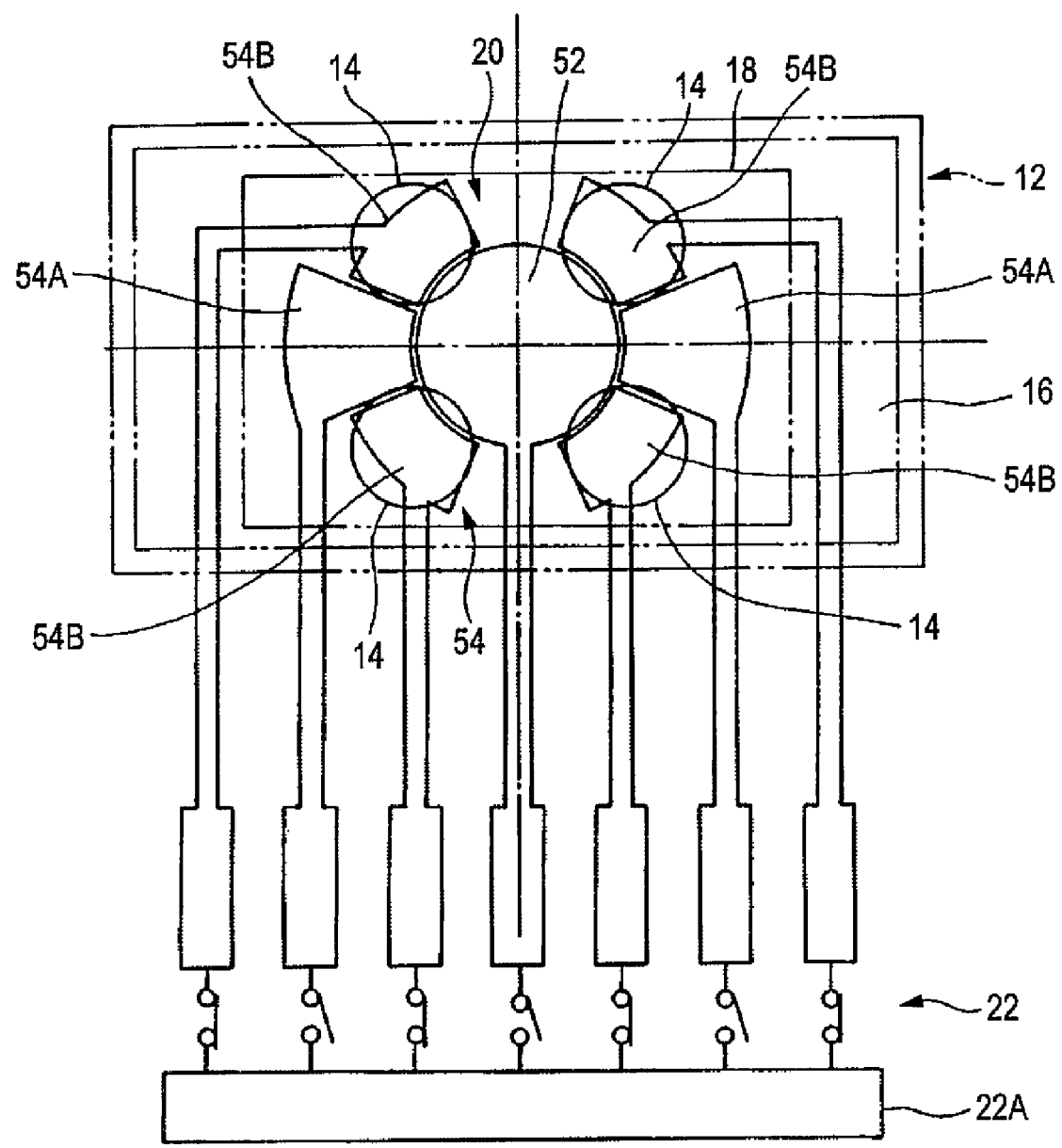
FIG. 21 is an explanatory diagram describing an operation of the optical element 10 according to the sixth embodiment.

FIGS. 19 to 21 are explanatory diagrams describing an operation of the optical element 10 according to the sixth embodiment.

As shown in FIG. 19, the optical element 10 includes the container 12, the first liquid 14, the second liquid 16, the first electrode 18 and the second electrode 20 and the voltage application section 22.

The container 12 has a first end wall (not shown) and a second end wall 26 facing and extending against each other in parallel in the direction that light passes through and side walls 28 connecting the first and second end walls 24 and 26 and a holding chamber 30 tightly enclosed by the first and second end walls and the side walls 28.

The first electrode 18 is provided on the first end wall 24, and the second electrode 20 is provided on the second end wall 26.

The second electrode 20 includes a central electrode member 52 and multiple surrounding electrode members 54 around the central electrode member 52. According to this embodiment, three surrounding electrode members 54 each are provided on both sides of the central electrode member 52. The three surrounding electrode members 54 include a first surrounding electrode member 54A at the center and two second surrounding electrode members 54B on both sides of the first surrounding electrode member 54A.

The first electrode 18 includes a single electrode member 56 facing against the central electrode member 52 and multiple surrounding electrode members 54.

The voltage application section 22 supplies the ground potential to the first electrode 18 and is configured to be capable of applying the voltage E selectively to each of the central electrode member 52 and six surrounding electrode members 54 of the second electrode 20.

Next, operations of the optical element 10 will be described.

First of all, an operation will be described in a case that the holding chamber 30 of the optical element 10 changes from the state that interrupts light to the state that allows light to pass therethrough.

As shown in FIG. 19, the first liquid 14 is initially positioned between the electrode member 56 of the first electrode 18 and the central electrode member 52 of the second electrode 20 in the holding chamber 30.

Under this state, the voltage application section 22 applies the voltage E to the central electrode member 52 and opens (or applies the ground potential to) the remaining six electrode members 54.

Thus, the electric field by the voltage E applied to the first electrode 18 and central electrode member 52 acts on the first liquid 14 facing the central electrode member 52, whereby the first liquid 14 does not move and can be held at the position. As a result, a most part of the first liquid 14 faces the central electrode member 52, and parts of the first liquid 14 face the adjacent six surrounding electrode members 54.

Under this condition, the incident light traveling toward the holding chamber 30 is interrupted by the first liquid positioned in the holding chamber 30 and having a low transmittance.

Next, as shown in FIG. 20, the voltage application section 22 opens (or applies the ground potential to) the central electrode member 52 and the four second surrounding electrode members 54B and applies the voltage E to the two first surrounding electrode members 54A. In other words, the position subject to the voltage application to the second electrode 20 is changed to the first surrounding electrode members 54A.

Then, the electric field by the voltage E applied to the first electrode 18 and the two first surrounding electrode members 54A acts on the first liquid 14 facing the central electrode member 52, whereby the first liquid 14 surrounded by the second liquid 16 is divided into two and moves toward the two first surrounding electrode members 54A.

Thus, the first liquid 14 is divided into two, which are then held facing the two first surrounding electrode members 54A.

In this case, most parts of the divided first liquid face the first surrounding electrode members 54A, and parts of the divided first liquid 14 face the adjacent central electrode member 52 and second surrounding electrode members 54B.

Next, as shown in FIG. 21, the voltage application section 22 opens (or applies the ground potential to) the central electrode member 52 and the two first surrounding electrode members 54A and applies the voltage E to the four second surrounding electrode members 54B. In other words, the position subject to the voltage application to the second electrode 20 is changed to the second surrounding electrode members 54B.

Then, the electric field by the voltage E applied to the first electrode 18 and four second surrounding electrode members 54B acts on the first liquid 14 facing the first surrounding electrode members 54A, whereby the first liquid 14 surrounded by the second liquid 16 is divided into two, which then move toward the second surrounding electrode members 54B.

Thus, the first liquid 14 is divided into four, which are then held facing the four second surrounding electrode members 54B.

In this case, most parts of the divided first liquid 14 face the second surrounding electrode members 54B, and parts of the divided first liquids 14 face the adjacent central electrode member 52 and the first surrounding electrode member 54A.

Under this condition, the incident light traveling toward the holding chamber 30 passes through the second liquid positioned in the holding chamber 30 and having a high transmittance.

Next, an operation will be described in a case that the holding chamber 30 of the optical element 10 changes from the state that allows light to pass therethrough to the state that interrupts light, conversely to the above.

As shown in FIG. 21, the first liquid 14 is divided into four, which are positioned at the positions facing the four second surrounding electrode members 54B. Under this state, the voltage application section 22 applies the voltage E to the central electrode member 52 and opens (or applies the ground potential to) all of the two first surrounding electrode members 54A and four second surrounding electrode members 54B.

Thus, the electric field by the voltage E applied to the first electrode 18 and central electrode member 52 acts on the first liquids 14 facing the four second surrounding electrode members 54B, whereby the divided first liquids 14 surrounded by the second liquid 16 move to the central electrode member 52.

Hence, as shown in FIG. 19, the four divided first liquids 14 are combined on the central electrode member 52.

Therefore, the electric field by the voltage E applied to the first electrode 18 and central electrode member 52 acts on the first liquid 14, whereby the first liquid 14 does not move and can be held at the position facing the central electrode member 52. As a result, a most part of the first liquid 14 faces the central electrode member 52, and parts of the first liquid 14 face the adjacent first surrounding electrode members 54A and second surrounding electrode members 54B.

Under this condition, the incident light traveling toward the holding chamber 30 is interrupted by the first liquid positioned in the holding chamber 30 and having a low transmittance.

Like the first embodiment, the optical element 10 according to the sixth embodiment can be functioned as a shutter by switching the holding chamber 30 between the state that allows light to pass therethrough and the state that interrupts light by changing the position subject to the voltage application by the voltage application section 22 and dividing and moving the first liquid 14 between the central electrode member 52 and the surrounding electrode members 54.

According to the sixth embodiment in particular, after the first liquid 14 is divided into two first, and each of the two divided first liquids 14 is divided into two. Therefore, the voltage enough for dividing the first liquid 14 into two may be only required to apply to the first surrounding electrode members 54A and second surrounding electrode members 54B. The voltage may be also smaller than the voltage for dividing the first liquid 14 into four simultaneously, which is advantageous for reducing power consumption.

In moving the four divided first liquids 14 to the central electrode member 52 and combining them into one, the speed of the movement of the first liquids 14 can be increased since the volume and mass of each of the four divided first liquids 14 are smaller than the volume and mass of the two divided first liquids 14. This is more advantageous for the improvement of the response property of the optical element 10.

Having described the cases that the first liquid 14 is divided into two, four and eight by providing two, four and eight electrode members as the multiple electrode members according to the embodiments, the number of the multiple electrode members is not limited thereto. Apparently, two or higher even-numbered or odd-numbered electrode members may be provided as the multiple electrode members to divide the first liquid 14.

Having described the case in which the optical element 10 is functioned as a shutter according to the embodiments, the optical element 10 may be apparently functioned as a Neutral Density Filter (ND filter). In this case, the transmittance of one of the first liquid 14 and the second liquid 16 may be changed to the value for functioning as the ND filter, and the transmittance of the other one of the first liquid 14 and the second liquid 16 may be changed to 100%.

Multiple kinds of ND filter having different transmittances (beam attenuation rates) may include the optical elements 10, and the multiple optical elements 10 may be multi-layered on the optical axis of the imaging apparatus 100 to provide an ND filter that can switch between or among multiple beam attenuation rates.

Having described the case in which the imaging apparatus 100 is a digital still camera or video camera according to this embodiment, the invention is widely applicable to various imaging apparatus such as a cellular phone with a camera, a Personal Digital Assistant (PDA) with a camera and a notebook PC with a camera.

It should be understood by those skilled in the art that various modifications, combinations, sub-combinations and alterations may occur depending on design requirements and other factors insofar as they are within the scope of the appended claims or the equivalents thereof.

The invention claimed is:

1. An optical element comprising:
a container having first and second end walls facing against each other in a direction that light passes through and end walls connecting the first and second end walls so as to form a holding chamber therein;
a polar or conductive first liquid within the holding chamber;
a second liquid within the holding chamber and not mixing with the first liquid;
a first electrode provided at the first end wall;
a second electrode having a center electrode member, first surrounding electrode members provided at the side of the center electrode member and second surrounding electrode members provided at the side of the first surrounding electrode member extending in a direction orthogonal to said direction that light passes through; and
voltage application means for applying voltage between the first electrode and the second electrode for applying an electric field to the first liquid;
wherein the voltage application means puts the optical element in a first light transmission state by performing first applying to apply a voltage to the first electrode and the first surrounding electrode members when the first liquid is positioned corresponding to the center electrode member so that the first liquid is divided and the divided first liquids move in said orthogonal direction toward positions corresponding to the first surrounding electrode members, and then, performing second applying to apply a voltage to the first electrode and the second surrounding electrode members when the first liquid is positioned corresponding to the first surrounding electrode members so that the first liquid is divided and the divided first liquids move in said orthogonal direction toward positions corresponding to the second surrounding electrode members, and
puts the optical element in a second light transmission state by applying a voltage to the first electrode and the center electrode member when each of the divided first liquids are positioned at a position corresponding to the second surrounding electrode members so that the divided first liquids move towards the position corresponding to the center electrode member thereby the divided first liquid are connected as one.

2. The optical element according to claim 1,
wherein transmittance of the first liquid is lower than that of the second liquid.

3. The optical element according to claim 2,
wherein the apparatus is used for shutter of an imaging apparatus and the shutter is closed when the first liquid is positioned corresponding to the center electrode member in said direction.

4. The optical element according to claim 3,
wherein the control of opening of the shutter comprises two steps.

5. The optical element according to claim 4,
wherein the shutter is open when the first liquid is further divided by next applying voltage to additional electrodes adjacent to each of the pair of electrode members, the next applying being subsequent to the dividing of the first liquid by application of voltage between the first electrode and the pair of electrode members.

6. An optical element comprising:
a container having first and second end walls facing against each other in a direction that light passes through and end walls connecting the first and second end walls so as to form a holding chamber therein;
a polar or conductive first liquid within the holding chamber;
a second liquid within the holding chamber and not mixing with the first liquid;
a first electrode provided at the first end wall;
a second electrode having a center electrode member and a pair of electrode members each provided at a position corresponding to the first electrode in said direction; and
a voltage source to apply voltage between the first electrode and the second electrode to apply an electric field to the first liquid;
wherein the voltage source applies voltage between the first electrode and the pair of electrode members when the first liquid is positioned corresponding to the center electrode member in said direction so that the first liquid is divided and the divided first liquids move at positions corresponding to each of the pair of electrode members, and applies voltage between the first electrode and the center electrode member when each of the divided first liquids are positioned at a position corresponding to each of the pair of electrode members in said direction so that the divided first liquid move to the position corresponding to the center electrode member thereby the divided first liquid is connected as one,
wherein transmittance of the first liquid is lower than that of the second liquid,
wherein the apparatus is a shutter of an imaging apparatus and the shutter is closed when the first liquid is positioned corresponding to the center electrode member in said direction, and
wherein a first of said two steps said first liquid is divided into two and in a second of said two steps each of said two divided first liquids is further divided such that said first liquid is divided into four.

7. The optical element according to claim 6, wherein the control of opening of the shutter comprises two steps.

8. The optical element according to claim 7,
further comprising additional electrodes adjacent to each of the pair of electrode members, wherein the shutter is open when the first liquid is further divided by next applying voltage to the additional electrodes, the next applying being subsequent to the dividing of the first liquid by previously applying of voltage between the first electrode and the pair of electrode members.

9. An optical element comprising:
a container having a first and second end walls facing against each other in a direction that light passes through and side walls connecting the first and second end walls so as to form a holding chamber therein;
a polar or conductive first liquid contained in the holding chamber;
a second liquid contained in the holding chamber and not mixing with the first liquid;
a first electrode provided at the first end wall;
a second electrode having a center electrode member and multiple surrounding electrode members extending in a direction orthogonal to said direction that light passes through; and
voltage application means for applying a voltage to the first electrode and the second electrode for applying an electric field to the first liquid;
wherein the voltage application means puts the optical element in a first light transmission state by applying a voltage to the first electrode and at least two of the multiple surrounding electrode members when the first liquid is positioned corresponding to the center electrode member so that the first liquid is divided and the divided first liquids move in said orthogonal direction towards positions corresponding to at least two of the multiple surrounding electrode members, and puts the optical element in a second light transmission state by applying a voltage to the first electrode and the center electrode member when each of the divided first liquids are positioned at a position corresponding to at least two of the multiple surrounding electrode members so that the divided first liquids move towards the position corresponding to the center electrode member thereby the divided first liquids are connected as one,
wherein the number of surrounding electrode members is six such that there are three surrounding electrode members on each side of the central electrode member.

10. The optical element according to claim 9, wherein optical transmittance of the first liquid is lower than the optical transmittance, of the second liquid.

11. The optical element according to claim 9, wherein optical transmittance of the second liquid is lower than the optical transmittance of the first liquid.

12. The optical element according to claim 9, wherein the optical element is a shutter of an imaging apparatus.

13. The optical element according to claim 9, wherein the shutter is closed when the first liquid is positioned corresponding to the center electrode member in said direction that light passes through.

14. The optical element according to claim 13, wherein two steps control when the shutter opens.

* * * * *